United States Patent
Wang et al.

(10) Patent No.: US 6,956,084 B2
(45) Date of Patent: *Oct. 18, 2005

(54) NANO-PARTICLE PREPARATION AND APPLICATIONS

(75) Inventors: Xiaorong Wang, Hudson, OH (US); Chenchy Jeffrey Lin, Hudson, OH (US); James Hall, Mogadore, OH (US); Sandra Warren, Massillon, OH (US); James Krom, Belmont, MA (US); Hajime Kondo, Tokyo (JP); Koichi Morita, Tokyo (JP)

(73) Assignee: Bridgestone Corporation, Tokyo (JP)

(*) Notice: Subject to any disclaimer, the term of this patent is extended or adjusted under 35 U.S.C. 154(b) by 46 days.

This patent is subject to a terminal disclaimer.

(21) Appl. No.: 10/223,393

(22) Filed: Aug. 19, 2002

(65) Prior Publication Data

US 2003/0198810 A1 Oct. 23, 2003

Related U.S. Application Data

(63) Continuation-in-part of application No. 10/038,748, filed on Dec. 31, 2001, now Pat. No. 6,689,469, and a continuation-in-part of application No. 09/970,830, filed on Oct. 4, 2001, now Pat. No. 6,437,050.

(51) Int. Cl.[7] ............................................. C08F 279/02
(52) U.S. Cl. .................... 525/313; 525/314; 525/332.2; 525/332.9
(58) Field of Search ................................. 525/313, 314, 525/332.3, 332.9

(56) References Cited

U.S. PATENT DOCUMENTS

| 4,773,521 A | 9/1988 | Chen |
| 4,829,135 A | 5/1989 | Gunesin et al. |
| 4,942,209 A | 7/1990 | Gunesin |
| 5,237,015 A | 8/1993 | Urban |
| 5,525,639 A | 6/1996 | Keneko et al. |
| 5,594,072 A | 1/1997 | Handlin, Jr. et al. |
| 5,763,551 A | 6/1998 | Wunsch et al. |
| 5,847,054 A | 12/1998 | McKee et al. |
| 5,883,173 A | 3/1999 | Elspass et al. |
| 5,891,947 A | 4/1999 | Hall et al. |
| 6,087,016 A | 7/2000 | Feeney et al. |
| 6,147,151 A | 11/2000 | Fukumoto et al. |
| 6,255,372 B1 | 7/2001 | Lin et al. |
| 6,437,050 B1 * | 8/2002 | Krom et al. ................ 525/313 |
| 6,598,645 B1 | 7/2003 | Larson |
| 6,777,500 B2 | 8/2004 | Lean et al. |
| 6,780,937 B2 | 8/2004 | Castner |

FOREIGN PATENT DOCUMENTS

| EP | 0 540 942 A1 | 5/1993 |
| EP | 0 590 491 A2 | 4/1994 |

OTHER PUBLICATIONS

Star Polymers by Immobilizing Functional Block Copolymerys, by Koji Ishizu, Tokyo Institute of Technology, Meguro–ku, Tokyo, Japan, *Star and Hyperbranched Polymers*, 1999, ISBN 0–8247–1986–7.

An article entitled "Functionalized Core–Shell Polymers Prepared by Microemulsion Polymerization" E. Mendizabal, et al. Dept. of Ingenieria Quimica, Univ. de Guadalajara, MX, 477/ANTE 97/1733–1737.

* cited by examiner

*Primary Examiner*—Robert D. Harlan
(74) *Attorney, Agent, or Firm*—Scott McCollister

(57) ABSTRACT

A nano-particle composition including a poly (alkenylbenzene) core and a poly (conjugated diene) or a poly(alkylene) surface layer is provided. The nano-particles have a mean average diameter less than about 100 nm. The nano-particles can be modified via, for example, hydrogenation or functionalization. The nano-particles can advantageously be incorporated into rubbers, elastomers, and thermoplastics.

40 Claims, 5 Drawing Sheets

The G' temperature dependence of examples 43, 44, 45, and 46.

NANO-PARTICLE PREPARATION AND APPLICATIONS

This application is a continuation-in-part of U.S. Ser. No. 09/970,830 filed Oct. 4, 2001 now U.S. Pat. No. 6,437,050 and U.S. Ser. No. 10/038,748 filed on Dec. 31, 2001 now U.S. Pat. No. 6,689,469.

BACKGROUND OF THE INVENTION

The present invention relates to polymer nano-particles, methods for their preparation, and their use as, for example, additives for rubber, including natural and synthetic elastomers. The invention advantageously provides several mechanisms for surface modifications, functionalization, and general characteristic tailoring to improve performance in rubbers, elastomers, and thermoplastics.

Polymer nano-particles have attracted increased attention over the past several years in a variety of fields including catalysis, combinatorial chemistry, protein supports, magnets, and photonic crystals. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization and emulsion polymerization.

Nano-particles can be discrete particles uniformly dispersed throughout a host composition. Nano-particles preferably are monodisperse in size and uniform in shape. However, controlling the size of nano-particles during polymerization and/or the surface characteristics of such nano-particles can be difficult. Accordingly, achieving better control over the surface composition of such polymer nano-particles also is desirable.

Rubbers may be advantageously modified by the addition of various polymer compositions. The physical properties of rubber moldability and tenacity are often improved through such modifications. Of course, however, the simple indiscriminate addition of nano-particles to rubber is likely to cause degradation of the matrix material, i.e., the rubber, characteristics. Moreover, it is expected that primarily the selection of nano-particles having suitable size, material composition, and surface chemistry, etc., will improve the matrix characteristics.

In this regard, development of nano-particles having a surface layer which would be compatible with a wide variety of matrix materials is desirable because discrete particles could likely disperse evenly throughout the host to provide a uniform matrix composition. However, the development of a process capable of reliably producing acceptable nano-particles has been a challenging endeavor. For example, the solubility of various monomers in traditional alkane solvents has made solution polymerization a difficult process by which to achieve nano-particles having a variety of surface layers. Moreover, the development of a solution polymerization process producing reliable nano-particles, particularly nano-particles advantageously employed in rubber compositions, has been elusive.

SUMMARY OF THE INVENTION

A nano-particle composition including a poly (alkenylbenzene) core and a poly(conjugated diene) surface layer is provided. The nano-particles have a mean average diameter less than about 100 nm.

A nano-particle composition including polyalkylene is provided. According to the embodiment, these nano-particles include a poly(alkenylbenzene) core, and a polyalkylene surface layer including at least one alkylene monomer unit. The nano-particles have a mean average diameter less than about 100 nm.

A process for forming polyalkenylbenzene/core nano-particles is also provided. The process includes polymerizing alkenylbenzene monomer and conjugated diene monomer in a hydrocarbon solvent to form a block polymer. After formation of the block polymer, a polymerization mixture including micelles of the block polymer is formed. At least one crosslinking agent is added to the polymerization mixture to form crosslinked nano-particles having a poly (alkenylbenzene) core and an outer poly(conjugated diene) layer from the micelles. The poly(conjugated diene) layer is optionally hydrogenated to form nano-particles containing a poly(alkenylbenzene) core and a polycrystalline outer layer.

In another embodiment, a functionalized polymer nano-particle is provided. The nano-particle includes a poly (alkenylbenzene) core, and a surface layer with monomer units selected from the group consisting of conjugated dienes and alkylenes, and a functional group attached on or near the surface. The nano-particles have a mean average diameter of less than about 100 nm.

A process for forming the functionalized polymer nano-particle composition is also provided. The process includes polymerizing alkenylbenzene monomer and conjugated diene monomer in a hydrocarbon solvent to form a block polymer. The polymerization is carried out in the presence of a functionalized initiator. A polymerization mixture is formed including micelles of the block polymer and at least one crosslinking agent is added to the polymerization mixture to form crosslinked nano-particles. The nano-particles have a mean average diameter less than about 100 nm.

According to a further embodiment, a polymer nano-particle including a poly(alkenylbenzene) core and a copolymer surface layer is also provided. The copolymer surface layer includes at least an alkenylbenzene monomer unit and a conjugated diene monomer unit. The nano-particle has a mean average diameter less than about 100 nm.

A process for forming a polymer nano-particle with a copolymer surface layer is also provided. The process includes copolymerizing at least one alkenylbenzene monomer and at least one conjugated diene to form a random copolymer. After the polymerization is at least substantially complete, an additional charge of alkenylbenzene monomer is made and polymerized onto the copolymer chain ends to form a diblock copolymer. Micelles of the diblock copolymer are formed and at least one crosslinking agent is added to the polymerization mixture to form crosslinked nano-particles. The nano-particles have a mean average diameter less than about 100 nm.

According to an additional embodiment, a soft gel composition including a thermoplastic elastomer, nano-particles, and an extender is provided. The composition is useful in producing molded products having heat resistance, high elasticity, excellent damping and super soft properties. A process for forming the nano-particles containing soft gel composition is also provided.

According to a further embodiment, a rubber composition including an elastomer, nano-particles, carbon black filler and a curing agent is provided. Such compositions can be useful in producing tread rubber, side walls, and other similar materials. A process for forming the rubber composition is also provided.

A silica rubber composition including an elastomer, nano-particles, silica and a curing agent having low shrinkage properties is provided. A process for preparing the silica rubber compound is similarly provided.

A rubber compound composition for engine mount usage is provided. Such compound shows its relatively high hysterisis, good tensile strength, strong resistance to creep, and high temperature resistance. A process of making the rubber compound for engine mount applications is similarly provided.

A soft compound for HDD gasket having excellent adhesion properties is provided. A process for making a soft compound for HDD gasket is also provided.

Herein throughout, unless specifically stated otherwise:

"vinyl-substituted aromatic hydrocarbon" and "alkenylbenzene" are used interchangeably; and "rubber" refers to rubber compounds, including natural rubber, and synthetic elastomers including styrene-butadiene rubber, ethylene propylene rubber, etc., which are known in the art.

DETAILED DESCRIPTION OF ILLUSTRATIVE EMBODIMENTS

General Nano-Particle Process of Formation

Figure 1:
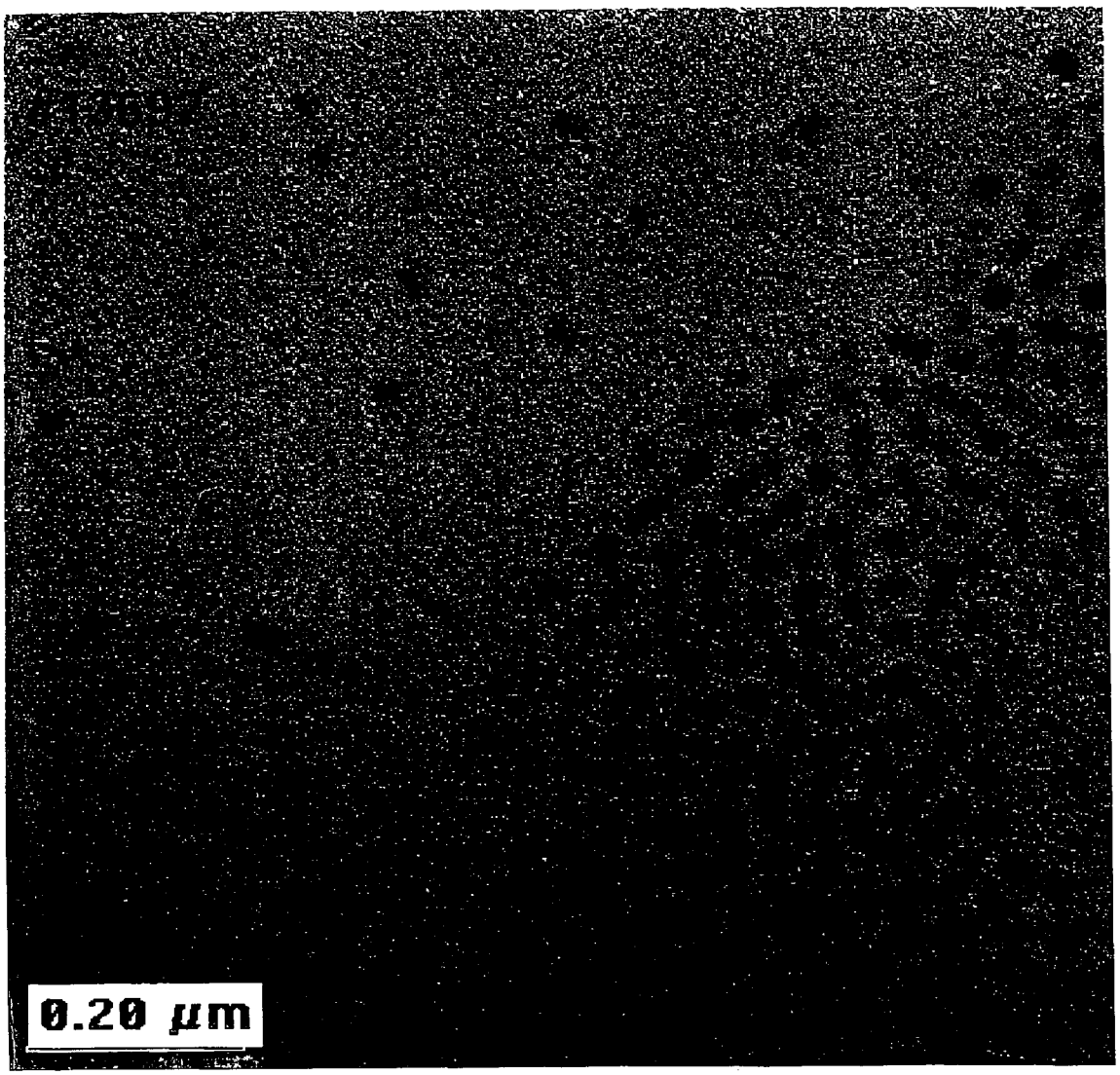
FIG. 1 is a transmission electron microscopy (TEM) photograph of nano-particles formed in accordance with EXAMPLE 1.

This application incorporates by reference U.S. Ser. No. 09/970,830 (filed Oct. 4, 2001) and U.S. Ser. No. 10/038,748 (filed Dec. 31, 2001).

One exemplary polymer nano-particle of the present invention is formed from diblock polymer chains having at least a poly(conjugated diene) block and a poly(alkenylbenzene) block. The poly(alkenylbenzene) blocks may be crosslinked to form the desired nanoparticles. The nano-particles have diameters—expressed as a mean average diameter—that are preferably less than about 100 nm, more preferably less than about 75 nm, and most preferably less than about 50 nm. The nano-particles preferably are substantially monodisperse and uniform in shape. The dispersity is represented by the ratio of $M_w$ to $M_n$, with a ratio of 1 being substantially monodisperse. The polymer nano-particles of the present invention preferably have a dispersity less than about 1.3, more preferably less than about 1.2, and most preferably less than about 1.1. Moreover, the nano-particles are preferably spherical, though shape defects are acceptable, provided the nano-particles generally retain their discrete nature with little or no polymerization between particles.

The nano-particles are preferably formed via dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination. However, as more fully described herein below, selection of a solvent in which one polymer forming the nano-particles is more soluble than another polymer forming the nano-particles is important in micelle formation.

With respect to the monomers and solvents identified herein, nano-particles are formed by maintaining a temperature that is favorable to polymerization of the selected monomers in the selected solvent(s). Preferred temperatures are in the range of about −40 to 250° C., with a temperature in the range of about 0 to 150° C. being particularly preferred. As described in more detail below, the interaction of monomer selection, temperature, and solvent facilitates the formation of block polymers which form micelles and ultimately the desired nano-particles.

According to one embodiment of the invention, a diblock polymer is formed of vinyl aromatic hydrocarbon monomers and conjugated diene monomers in the hydrocarbon solvent. The diblock polymer contains at least a first end block that is soluble in the dispersion solvent, preferably a conjugated diene monomer, and at least a second end block which is less soluble in the dispersion solvent, preferably a vinyl-substituted aromatic hydrocarbon monomer. Moreover, in one preferred embodiment, a vinyl-substituted aromatic hydrocarbon monomer is chosen, the polymer of which is generally insoluble in the dispersion solvent.

As is known in the art, such a diblock copolymer may be formed by living anionic polymerization, in which a vinyl-substituted aromatic hydrocarbon monomer is added to a completely polymerized conjugated diene monomer. Another method of forming substantially diblock polymers is the living anionic copolymerization of a mixture of monomers, such as a conjugated diene monomer and a vinyl-substituted aromatic hydrocarbon monomer in a hydrocarbon solvent, particularly, in the absence of certain polar additives, such as ethers, tertiary amines, or metal alkoxides which could otherwise affect the polymerization of the separately constituted polymer blocks. Under these conditions, the conjugated diene generally polymerizes first, followed by the polymerization of the vinyl-substituted aromatic hydrocarbon. Of course, certain advantages, as described below may be achieved via a random polymerization of at least one block of the polymer.

Nonetheless, it is generally preferred that a vinyl substituted aromatic hydrocarbon polymerize last, positioning the living end of the polymerizing polymer on a vinyl aromatic block to facilitate later cross-linking.

Such copolymers, formed by either method, are believed to aggregate to form micelle-like structures, with for example, vinyl-substituted aromatic blocks directed toward the centers of the micelles and conjugated diene blocks as tails extending therefrom. It is noted that a further hydrocarbon solvent charge or a decrease in polymerization mixture temperature may also be used, and may in fact be required, to obtain formation of the micelles. Moreover, these steps may be used to take advantage of the general insolubility of the vinyl-aromatic blocks. An exemplary temperature range for micelle formation is between about 40 and 100° C., more preferably between about 50 and 80° C.

After the micelles have formed, additional conjugated diene monomer and/or vinyl-substituted aromatic hydrocarbon monomer can be added to the polymerization mixture as desired.

After formation of the micelles, a cross-linking agent is added to the polymerization mixture. Preferably, a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the desired nano-particle. Consequently, nano-particles are formed from the micelles with a core including, for example, styrene monomer units and a surface layer including, for example, butadiene monomer units.

The conjugated diene monomers contemplated for the block polymer are those soluble in non-aromatic hydrocarbon solvents. $C_4$–$C_8$ conjugated diene monomers are the most preferred. Exemplary conjugated diene monomers include 1,3-butadiene, isoprene, and 1,3-pentadiene.

Vinyl-substituted aromatic hydrocarbon monomers include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons, and mixtures thereof.

The diblock polymer, preferably has $M_w$ of about 5,000 to 200,000, more preferably between about 10,000 and 100,000. A typical diblock polymer will be comprised of 5 to 95% by weight conjugated diene and 5 to 95% by weight vinyl-substituted aromatic hydrocarbon, more preferably 20 to 80% by weight, and most preferably 40 to 60% by weight of each contributed monomer type.

The micelle formed by the polymerization of vinyl-substituted aromatic hydrocarbons and conjugated diene monomers is preferably crosslinked to enhance the uniformity and permanence of shape and size of the resultant nano-particle. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers are acceptable. A preferred crosslinking agent is divinylbenzene (DVB).

A 1,2-microstructure controlling agent or randomizing modifier is optionally used to control the 1,2-microstructure in the conjugated diene contributed monomer units, such as 1,3-butadiene, of the nano-particle. Suitable modifiers include hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as about 4000 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the surface layer of the polymer nano-particle. The 1,2-microstructure content of the conjugated diene units is preferably between about 1 and 99%, more preferably between about 5 and 95%.

Without being bound by theory, it is believed that an exemplary micelle will be comprised of ten to five hundred diblock polymers yielding, after crosslinking, a nano-particle having a $M_w$ of between about 5,000 and 10,000,000, preferably between about 5,000 and 4,500,000.

Structural Modifications

In an alternative embodiment, the surface layer of the polymer nano-particle includes a copolymer including at least one alkenylbenzene monomer unit and at least one conjugated diene monomer unit. The copolymer may be random or ordered. Accordingly, the surface layer may include an SBR rubber. Herein throughout, references to a poly(conjugated diene) surface layer are understood to include copolymers of the type described here.

Similarly, the density of the nanoparticle may be controlled by including diblock and monoblock polymer chains in the micelles. One method for forming such polymer chains includes forming a first polymer of conjugated diene monomers in the hydrocarbon solvent. After formation of the first polymer, a second monomer is added to the polymerization, along with additional initiator. The second monomer polymerizes onto the first polymer to form a diblock polymer as well as forming a separate second polymer which is a mono-block polymer. The diblock polymer contains at least a first end block that is soluble in the dispersion solvent, preferably a conjugated diene monomer, and a second end block which is less soluble in the dispersion solvent, preferably a vinyl-substituted aromatic hydrocarbon monomer. In a preferred embodiment, a vinyl-substituted aromatic hydrocarbon is chosen which as a polymer is generally insoluble in the dispersion solvent.

Without being bound by theory, it is believed that a large number of mono-block polymer chains in the core of the nano-particle results in separation and less entangling of the conjugated diene tails of the diblock chains. The resultant surface layer thus may have a brush-like structure.

The multi-block polymer preferably has $M_w$ of about 5,000 to 10,000,000 more preferably between about 10,000 and 200,000. A typical diblock polymer will be comprised of 5 to 95% by weight conjugated diene and 5 to 95% by weight vinyl-substituted aromatic hydrocarbon, more preferably 20 to 80% by weight, and most preferably 30 to 70% by weight of each contributed monomer type. Each block preferably has $M_w$ between about 1,000 and 10,000,000, more preferably between about 2,000 and 5,000,000.

The density of the poly(conjugated diene) surface layer of the nano-particles may be controlled by manipulating the ratio of diblock to mono-block polymer chains. This ratio may be manipulated by altering the amount of initiator added during each step of the polymerization process. For example, a greater amount of initiator added during the polymerization of the conjugated diene monomer than added during the polymerization of the alkenylbenzene monomer would favor diblock formation over mono-block formation, resulting in a high density surface layer. Conversely, a greater amount of initiator added during the polymerization of the alkenylbenzene monomer than added during the polymerization of the conjugated diene monomer would favor mono-block formation over diblock formation, resulting in a low-density surface layer. The ratio of mono-blocks to diblocks can be from 1 to 99, preferably 10 to 90, more preferably 20 to 80.

Hydrogenation of a Nano-Particle Surface Layer

After micelle formation, or alternatively, after crosslinking, the polydiene blocks may be hydrogenated to form a modified surface layer. A hydrogenation step may be carried out by methods known in the art for hydrogenating polymers, particularly polydienes. A preferred hydrogenation method includes placing the crosslinked nano-particles in a hydrogenation reactor in the presence of a catalyst. After the catalyst has been added to the reactor, hydrogen gas ($H_2$) is charged to the reactor to begin the hydrogenation reaction. The pressure is adjusted to a desired range via addition of $H_2$, preferably between about 10 and 3000 kPa, more preferably between about 50 and 2600 kPa. $H_2$ may be charged continuously or in individual charges until the desired conversion is achieved. Preferably, the hydrogenation reaction will reach at least about 20% conversion, more preferably greater than about 85% conversion. The conversion reaction may be monitored by $H^1$ NMR.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octolate, nickel ethylhexanoate, and mixtures thereof.

The surface layer formed by an optional hydrogenation step will vary depending on the identity of the monomer units utilized in the formation of the nano-particle surface layer, particularly the poly(conjugated diene) blocks. For example, if the poly(conjugated diene) block contains 1,3-butadiene monomer units, the resultant nano-particle layer after hydrogenation will be a crystalline poly(ethylene) layer. In another embodiment, a layer may include both ethylene and propylene units after hydrogenation if the non-hydrogenated poly(conjugated diene) block contains isoprene monomer units. It should be noted that the non-hydrogenated poly(conjugated diene) block may contain a mixture of conjugated diene monomer units, or even alkenylbenzene units, resulting in a mixture of monomer units after hydrogenation.

Initiators and Functionalized Nano-Particles

The present inventive process is preferably initiated via addition of anionic initiators that are known in the art as useful in the copolymerization of diene monomers and vinyl aromatic hydrocarbons. Exemplary organo-lithium catalysts include lithium compounds having the formula $R(Li)_x$, wherein R represents a $C_1$–$C_{20}$ hydrocarbyl radical, preferably a $C_2$–$C_8$ hydrocarbyl radical, and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, etc.

Specific examples of exemplary initiators include ethyllithium, propyllithium, n-butyllithium, sec-butyllithium, tert-butyllithium, and the like; aryllithiums, such as phenyllithium, tolyllithium, and the like; alkenyllithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred. Other suitable lithium inititators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Functionalized lithium initiators are also contemplated as useful in the present copolymerization. Preferred functional groups include amines, formyl, carboxylic acids, alcohol, tin, silicon, silyl ether and mixtures thereof.

Especially preferred initiators are amine-functionalized initiators, such as those that are the reaction product of an amine, an organo lithium and a solubilizing component. The initiator has the general formula:

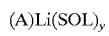

$$(A)Li(SOL)_y$$

where y is from about 1 to about 3; SOL is a solubilizing component selected from the group consisting of hydrocarbons, ethers, amines or mixtures thereof; and, A is selected from the group consisting of alkyl, dialkyl and cycloalkyl amine radicals having the general formula:

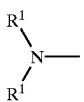

and cyclic amines having the general formula:

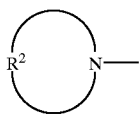

where $R^1$ is selected from the group consisting of alkyls, cycloalkyls or aralkyls having from 1 to about 12 carbon atoms, and $R^2$ is selected from the group consisting of an alkylene, substituted alkylene, oxy- or N-alkylaminoalkylene group having from about 3 to about 16 methylene groups. An especially preferred functionalized lithium initiator is hexamethylene imine propyllithium.

Tin functionalized lithium initiators may also be preferred as useful in the present invention. Suitable tin functionalized lithium initiators include tributyl tin lithium, triocty tin lithium, and mixtures thereof.

Anionic initiators generally are useful in amounts ranging from about 0.01 to 60 millimoles per hundred grams of monomer charge.

A nano-particle including diblock polymers initiated with a functionalized initiator may include functional groups on the surface of the nano-particle. For example, when block polymers are initiated by hexamethylene imine propyllithium, the initiator residue remaining at the beginning of the polymer chain will contain an amine group. Once the polymer chains have aggregated and have been crosslinked, the resultant nano-particles will contain amine groups on or near the nano-particle surface.

An exemplary nano-particle formed from copolymers initiated by a functionalized tin lithium initiator may have a crosslinked alkenylbenzene core, for example polystyrene, and a surface layer including at least a poly(conjugated diene), for example 1,3-butadiene. The surface layer will also include a functionalized initiator residue at the individual chain ends (e.g., tin).

Polymer Nano-Particle Applications

A variety of applications are contemplated for use in conjunction with the nano-particles of the present invention. Furthermore, the several mechanisms described herein for modifying the nano-particles render them suitable for different applications. All forms of the present inventive nano-particles are, of course, contemplated for use in each of the exemplary applications and all other applications envisioned by the skilled artisan.

General Rubber

After the polymer nano-particles have been formed, they may be blended with a rubber to improve the physical characteristics of the rubber composition. Nano-particles are useful modifying agents for rubbers because they are discrete particles which are capable of dispersing uniformly throughout the rubber composition, resulting in uniformity of physical characteristics. Furthermore, certain of the present polymer nano-particles are advantageous because the surface layer of poly(conjugated diene), especially vinyl-modified poly(conjugated diene), is capable of bonding with the rubber matrix due to the accessibility of the double bonds in the poly(conjugated diene).

The present polymer nano-particles are suitable for modifying a variety of rubbers including, but not limited to, random styrene/butadiene copolymers, butadiene rubber, poly(isoprene), nitrile rubber, polyurethane, butyl rubber, EPDM, and the like. Advantageously, the inclusion of the present nano-particles have demonstrated rubbers having improved tensile and tear strength of at least about 30% over a rubber modified with non-spherical copolymers.

Furthermore, nano-particles with hydrogenated surface layers may demonstrate improved compatibility with specific rubbers. For example, nano-particles including a hydrogenated polyisoprene surface layer may demonstrate superior bonding with and improved dispersion in an EPDM rubber matrix due to the compatibility of hydrogenated isoprene with EPDM rubber.

Additionally, nano-particles with copolymer surfaces may demonstrate improved compatibility with rubbers. The copolymer tails with the surface layer of the nano-particles may form a brush-like surface. The host composition is then able to diffuse between the tails allowing improved interaction between the host and the nano-particles.

Hard Disk Technology

Hydrogenated nano-particles prepared in accordance with the present invention may also find application in hard disk technology.

Disk drive assemblies for computers traditionally include a magnetic storage disk coaxially mounted about a spindle apparatus that rotates at speeds in excess of several thousand revolutions per minute (RPM). The disk drive assemblies also include a magnetic head that writes and reads information to and from the magnetic storage disk while the magnetic disk is rotating. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from the environmental contaminant outside of the housing.

Serious damage to the magnetic disks, including loss of valuable information, can result by introducing gaseous and particulate contaminates into the disk drive assembly housing. To substantially prevent or reduce the introduction of gaseous and particulate contaminants into the disk drive housing, a flexible sealing gasket is disposed between the disk drive mounting base (support) plate and the disk drive assembly housing or cover plate. A sealing gasket is usually prepared by punching out a ring-shaped gasket from a sheet of cured elastomer. The elastomeric gasket obtained is usually attached to the base plate of the disk drive assembly mechanically, such as affixing the gasket with screws, or adhesives. The hydrogenated nano-particles, when compounded with a polyalkylene and a rubber, demonstrate a tensile strength comparable to that necessary in hard disk drive compositions.

Thermoplastic Gels

Nano-particles prepared in accord with the present invention, whether hydrogenated or non-hydrogenated may also be blended with a variety of thermoplastic elastomers, such as SEPS, SEBS, EEBS, EEPE, polypropylene, polyethylene, and polystyrene. For example, nano-particles with hydrogenated isoprene surface layers may be blended with a SEPS thermoplastic to improve tensile strength and thermostability. These blends of thermoplastic elastomer and nano-particles would typically be extended as known in the art. For example, suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in compositions of the present invention are low molecular weight organic materials having a number-average molecular weight of less than 20,000, preferably less than 10,000, and most preferably less than 5000. Although there is no limitation to the material which may be employed, the following is a list of examples of appropriate materials:

(1) Softening agents, namely aromatic naphthenic and parraffinic softening agents for rubbers or resins;
(2) Plasticizers, namely plasticizers composed of esters including phthalic, mixed pthalic, aliphatic dibasic acid, glycol, fatty acid, phosphoric and stearic esters, epoxy plasticizers, other plasticizers for plastics, and phthalate, adipate, scbacate, phosphate, polyether and polyester plasticizers for NBR;
(3) Tackifiers, namely coumarone resins, coumaroneindene resins, terpene phenol resins, petroleum hydrocarbons and rosin derivative;
(4) Oligomers, namely crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadieneacrylonitrile rubber, polychloroprene, etc.), silicone oligomers, and poly-a-olefins;
(5) Lubricants, namely hydrocarbon lubricants such as paraffin and wax, fatty acid lubricants such as higher fatty acid and hydroxy-fatty acid, fatty acid amide lubricants such as fatty acid amide and alkylenebisfatty acid amide, ester lubricants such as fatty acidlower alcohol ester, fatty acid-polyhydrie alcohol ester and fatty acid-polyglycol ester, alcoholic lubricants such as fatty alcohol, polyhydric alcohol, polyglycol and polyglycerol, metallic soaps, and mixed lubricants; and,
(6) Petroleum hydrocarbons, namely synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used in as extenders.

Tire Rubber

One application for nano-particle containing rubber compounds is in tire rubber formulations.

Vulcanizable elastomeric compositions of the invention are prepared by mixing a rubber, a nanoparticle composition, with a reinforcing filler comprising silica, or a carbon black, or a mixture of the two, a processing aid and/or a coupling agent, a cure agent and an effective amount of sulfur to achieve a satisfactory cure of the composition.

The preferred rubbers are conjugated diene polymers, copolymers or terpolymers of conjugated diene monomers and monovinyl aromatic monomers. These can be utilized as 100 parts of the rubber in the tread stock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, acrylonitrilebutadiene rubber (NBR), silicone rubber, the fluoroelastomers, ethylene acrylic rubber, ethylenepropylene rubber, ethylene-propylene terpolymer (EPDM), ethylene vinyl acetate copolymer, epicholrohydrin rubber, chlorinated polyethylene-propylene rubbers, chlorosulfonated polyethylene rubber, hydrogenated nitrile rubber, terafluoroethylene-propylene rubber, and the like.

Examples of reinforcing silica fillers which can be used in the vulcanizable elastomeric composition include wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are preferred. Silica can be employed in the amount of about one to about 100 parts per hundred parts of the elastomer (phr), preferably in an amount of about 5 to 80 phr and, more preferably, in an amount of about 30 to about 80 phrs. The useful upper range is limited by the high viscosity imparted by fillers of this type. Some of the commercially available silica which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0, and J. M. Huber Corporation.

Including surface functionalized nano-particles in silica containing rubber compositions has been shown to decrease the shrinkage rates of such silica containing rubber compositions. Functionalized nano-particles may be compounded in silica compositions in concentrations up to about 30 wt % of the total composition, more preferably up to about 40 wt %, most preferably up to about 50 wt %.

The rubber can be compounded with all forms of carbon black, optionally additionally with silica. The carbon black can be present in amounts ranging from about one to about 100 phr. The carbon black can include any of the commonly available, commercially-produced carbon blacks, but those having a surface are of at least 20 $m^2/g$ and, or preferably, at least 35 $m^2/g$ up to 200 $m^2/g$ or higher are preferred.

Among useful carbon blacks are furnace black, channel blacks, and lamp blacks. A mixture of two or more of the above blacks can be used in preparing the carbon black products of the invention. Typical suitable carbon black are N-110, N-220, N-339, N-330, N-352, N-550, N-660, as designated by ASTM D-1765-82a.

Certain additional fillers can be utilized including mineral fillers, such as clay, talc, aluminum hydrate, aluminum hydroxide and mica. The foregoing additional fillers are optional and can be utilized in the amount of about 0.5 phr to about 40 phr.

Numerous coupling agent and compatibilizing agent are know for use in combining silica and rubber. Among the silica-based coupling and compatibilizing agents include silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl) tetrasulfide (Si69), bis-(3-triethoxysilylpropyl) disulfide (Si75), and those alkyl alkoxysilanes of the such as octyltriethoxy silane, and hexyltrimethoxy silane.

It is readily understood by those having skill in the art that the rubber composition would be compounded by methods generally known in the rubber compounding art, such as mixing the various vulcanizable polymer(s) with various commonly used additive materials such as, for example, curing agents, activators, retarders and accelerators processing additives, such as oils, resins, including tackifying resins, plasticizers, pigments, additional filers, fatty acid, zinc oxide, waxes, antioxidants, anti-ozonants, and peptizing agents. As known to those skilled in the art, depending on the intended use of the sulfur vulcanizalbe and sulfur vulcanized material (rubbers), the additives mentioned above are selected and commonly used in the conventional amounts.

Specifically, the above-described nano-particle containing rubber compounds are contemplated for use in rubber compounds used to make tire treads and side walls due to the enhanced reinforcement capabilities of the present nano-particles. The higher dynamic modulus (G') and its lower temperature dependence along with the lower hysteresis values at high temperature leads to the improved cornering, handling, dry, snow, and wet traction, rolling resistance, dispersion, and aging properties of the resultant tire compositions. Improved aging properties, thermal aging (high temperature), or mechanical aging (static or dynamic deformation cycles), include retention of the G' modulus, hysteresis, mechanical strengths, etc. Tin-functionalized nano-particles are especially suited for use in tire compositions. Nano-particles including a copolymer surface layer are also suitable for use in such tire compositions, because the longer copolymer chains in the surface layer leads to greater diffusion of the host rubber composition into the surface layer of the nano-particle. Of course, the functionalized nano-particle having a copolymer surface layer, i.e., the combination of the two alternatives may be most beneficial.

Engineering Plastics and Others

Similarly, the nano-particles can be added into typical plastic materials, including polyethylene, polypropylene, polystyrene, polycarbonate, nylon, polyimides, etc. to for example, enhance impact strength, tensile strength and damping properties.

Of course, the present inventive nano-particles are also suited to other presently existing applications for nano-particles, including the medical field, e.g. drug delivery and blood applications, information technology, e.g. quantum computers and dots, aeronautical and space research, energy, e.g., oil refining, and lubricants.

Engine Mount, Etc.

Another application for such rubbers is in situations requiring superior damping properties, such as engine mounts and hoses (e.g. air conditioning hoses). Rubber compounds of high mechanical strength, super damping properties, and strong resistance to creep are demanded in engine mount manufacturers. In engine mounts, a rubber, because it sits most of its life in a packed and hot position, requires very good characteristics. Utilizing the nano-particles within selected rubber formulations can improve the characteristics of the rubber compounds.

The present invention now will be described with reference to non-limiting examples. The following examples and tables are presented for purposes of illustration only and are not to be construed in a limiting sense.

EXAMPLES

Preparation of St-Bd Nano-Particles

Unless otherwise specified, an 8 L reactor equipped with external jacked heating and internal agitation was used for all polymerizations. 1,3-Butadiene was used as a 22.0 or 21.1 weight percent solution in hexane (Bridgestone/Firestone Polymer Co., Akron, Ohio). Styrene was used as a 33.0 wt. % solution in hexane (Bridgestone/Firestone Polymer Co., Akron, Ohio), and n-butyllithium was used as a 15 wt % solution in hexane (Bridgestone/Firestone Polymer Co., Akron, Ohio). The antioxidant butylated hydroxytoluene (BHT) (Aldrich Chem. Co., Milwaukee, Wis.), was used as an approximately 17 wt % solution in hexane. Technical grade divinylbenzene (DVB), (80% as a mixture of isomers, Aldrich) was passed through a column of inhibitor remover under $N_2$ before use. Neat bis-oxalanyl propane (OOPs) (Aldrich), was similarly treated and used as a 1.6 M solution in hexane, stored over calcium hydride.

Examples 1–3

Formation of PS-PBd Nanoparticles
Preparation of Diblock Polymers:

The reactor was charged with 1.03 kg of 22% butadiene in hexane, 0.55 kg hexane, and 0.70 kg styrene (33 wt %) in hexane. The batch was heated to 57° C., followed by initiation of polymerization with 5.0 mL n-BuLi (1.6 M) diluted in 30 mL hexane. The temperature was maintained at 57° C. for the duration of the polymerization.

Example 1

Particle Formation:

Following the diblock polymer preparation, the reactor jacket was set to 26° C. The reactor was charged with 1.36 kg styrene (33 wt %) diluted with an additional 0.90 kg hexane, followed by 50 mL DVB containing 1.0 mL OOPs. The reactor jacket was set to 50° C. The exotherm peaked at 54° C. about 30 minutes after the addition of the DVB/OOPs mixture. About half of the batch was dropped into dried, $N_2$ purged bottles, and polymerization was terminated with about 1 mL isopropanol and treated with about 3 mL BHT solution. For transmission electron microscopy (TEM) analysis, about 10 mL of solution was taken from the batch and further diluted with the hexane solvent to about $10^{-4}$ wt %. A drop of the diluted solution was then deposited on a formvar-carbon coated micro-grid. After the solvent was evaporated, the grid was stained with $OsO_4$, and then examined by TEM. The results showed that the average particle diameter was about 50 nm with polydispersity of about 1.1.

Example 2

The diblock polymer was prepared as described above. Particle formation was also performed as described above, except 1.22 kg of styrene (33 wt %) 1.0 kg hexane, and 100 mL of DVB containing 1.0 mL of OOPs solution was used. The jacket temperature was raised to 57° C., then 65° C. overnight because no exotherm was observed. Half of the batch was dropped into bottles and terminated as described above. The particles constituted about 18% by weight of the mixture. To the remainder of the batch was added 2.27 kg of 21.6% butadiene, but no polymerization occurred. Further polymerization was initiated with a charge of 2.5 mL of n-BuLi (1.6 M solution) and the batch subsequently gelled.

Example 3

The dispersant was prepared as described above, except 1.8 kg of butadiene (22 wt %) was used. The living dispersant was diluted with 0.91 kg hexane, and a solution of 0.453 kg DVB in 0.91 kg hexane was charged into the reactor. The reactor temperature control was switched from batch control at 57° C. to jacket at 57° C. After about 4 hours, the batch was dropped into bottles and terminated as described above. The particles constituted about 11% by weight of the mixture. The GPC analysis showed that the particle had a $M_n$ of about 976,000. It is noted that throughout the present disclosure, the reference to molecular weight of nano-particles by GPC analysis is not considered precise as the nano-particles of the present invention do not strictly correlate predictably with linear polymers. The polydispersity of the molecular weight was 1.11. The nano-particles were examined by TEM and had an average particle size of about 15 nm, and a dispersity of particle size of about 1.1 (FIG. 1).

Examples 4–7

Application of the Nano-Particles 1–3 in Rubber Compounds

Four kinds of rubber compositions were prepared according to the formulation shown in Tables 1 and 2 by selectively using the synthesized particles to replace the amount of polymer (polybutadiene) in the compound formulation. The physical details of these compositions are shown in Table 3. Two controls were used (Examples 4 and 5) to provide a comparison with the test compounds (Examples 6 and 7) wherein the nano-particles were derived from Example 3. In each sample, a blend of the ingredients was kneaded by the method described in Table 4. The final stock was sheeted and molded at 160° C. for 30 minutes.

The physical characteristics of the rubber compounds shown in Table 3 were measured by accepted standards in the art. The tensile strength measurements were based on conditions of ASTM-D 412 at 22° C. Test specimen geometry was taken in the form of a ring of a width of 0.127 cm and of a thickness of 0.197 cm. The specimen was tested at a specific gauge length of 2.54 cm. The measurement of tear strength was based on conditions of ASTM-D 624 at 170° C. Test specimen geometry was taken in the form of a nicked ring (ASTM-624-C). The specimen was tested at the specific gauge length 11.29 cm. The hysteresis loss was measured with a Dynastat Viscoelastic Analyzer. Test specimen geometry was taken in the form of a strip of a length of 30 mm and of a width of 15 mm. A frequency of 5 Hz at 2% strain was employed. Measurement of the wet traction was performed on the British Portable Skid Tester. The sample geometry for the test was a rectangular bar of 2.54×7.6×0.64 cm.

As seen in Table 3, the rubber compositions of Examples 6 and 7 exhibit balanced physical properties. The tensile strength and tear strength of the modified rubber compounds are ~30% better than those of the comparative compounds at equal modulus.

TABLE 1

Composition of Master Batch

| Component | Concentration (pbw) |
| --- | --- |
| Rubber | 100 |
| Carbon black | 50 |
| Aromatic oil | 15 |
| Zinc oxide | 3 |
| Hydrocarbon resin (tackifiers) | 2 |
| Antioxidants | 0.95 |
| Stearic Acid | 2 |
| Wax | 1 |

TABLE 2

Composition for Final Batch

| Component | Concentration (pbw) |
| --- | --- |
| Sulfur (curing agent) | ~1.30 |
| Cyclohexyl-benzothiazole sulfenamide (accelerator) | 1.4 |
| Diphenylguanidine (accelerator) | .2 |

TABLE 3

Physical Characteristics of Rubber Formulations

| | Example | | | |
| --- | --- | --- | --- | --- |
| | 4 | 5 | 6 | 7 |
| Nano-particle (pbw) | 0 | 0 | 10 | 10 |
| Butadiene rubber (pbw) | 100 | 100 | 90 | 90 |
| Carbon black (pbw) | 50 | 50 | 50 | 50 |
| Aromatic oil (pbw) | 15 | 15 | 15 | 15 |
| Sulfur (pbw) | 1.3 | 1.9 | 1.4 | 1.6 |
| Mooney Viscosity | 89.2 | 86.8 | 82.98 | 82.9 |
| CB Dispersion index | 96.3 | 97.2 | 99 | 98.5 |

TABLE 3-continued

Physical Characteristics of Rubber Formulations

| | Example | | | |
|---|---|---|---|---|
| | 4 | 5 | 6 | 7 |
| Shore A | | | | |
| 22° C. (3 sec) | 64.1 | 66.4 | 67.2 | 68.3 |
| 100° C. (3 sec) | 62.7 | 64.6 | 63.3 | 64.9 |
| Ring Tensile (23° C.) | | | | |
| Tb (kPa) | 12,786 | 13,158 | 16,598 | 13,138 |
| Eb (%) | 444 | 373 | 502 | 382 |
| Tb * Eb (breaking energy) | 5,676,984 | 4,907,934 | 8,332,196 | 5,018,716 |
| Modulus at 300% Elongation (kPa) | 6,807 | 8,557 | 7,689 | 9,191 |
| Modulus at 50% Elongation (kPa) | 1,295 | 1,509 | 1,481 | 1,654 |
| Ring Tear (170° C.) | | | | |
| Strength (kg/cm) | 33.5 | 27.8 | 39.7 | 37.2 |
| Travel (%) | 320 | 175 | 358 | 291 |
| $T_g$ (° C.) | −76 | −75 | −76 | −75 |
| Temp Sweep (2% strain) | | | | |
| tan δ @ 50° C. | 0.1343 | 0.1171 | 0.1721 | 0.1695 |
| tan δ @ 20° C. | 0.1559 | 0.1422 | 0.1874 | 0.1881 |
| tan δ @ 0° C. | 0.1698 | 0.1598 | 0.1961 | 0.2002 |

TABLE 4

| Mixing Conditions | |
|---|---|
| Mixer | 300 g Brabender |
| Agitation Speed | 60 rpm |
| Master Batch Stage | |
| Initial Temperature | 110° C. |
| 0 minutes | Charging polymers |
| 0.5 minutes | Charging oil and carbon black |
| 5.0 minutes | Drop |
| Final Batch Stage | |
| Initial Temperature | 75° C. |
| 0 seconds | Charging master stock |
| 30 seconds | Charging curing agent |
| 75 seconds | drop |

Example 8

Synthesis of Hydrogenated Nano-Particles

The reactor was first charged with 0.51 kg of hexane, then was charged with 1.04 kg of butadiene/hexane blend that contained 21.6 wt % of butadiene. The batch was then heated to 57° C. After the temperature stabilized, polymerization was initiated with 5.4 mL of a 1.5 M solution of butyllithium in hexane. The batch temperature was maintained at 57° C. for the duration of polymerization. After 2 hours (when the reaction was finished), the reactor was charged with 0.68 kg of styrene/hexane blend that contained 33 wt % of styrene. After an additional two-hour reaction period, the reactor was charged with 1.8 kg of hexane and the 50 mL of divinyl benzene. The reactor was maintained at 57° C. for another two hour period, and a small amount of the product was taken for GPC analysis. The GPC analysis of the product showed that the polymer had a number average molecular weight of 826,559. The polydispersity was 1.10. The conversion of the reaction was about 100%.

2.04 kg of the product was then transferred to a 4 L hydrogenation reactor. Then, the reactor was charged with 75 mL of a Ni catalyst solution, which was made according to the following procedure:

111 mL of nickel octolate (8 wt % in hexane), 37 mL hexane, and 06 mL of cyclohexene were charged to a 1 liter $N_2$ purged bottle. Then, the bottle was placed into a dry ice bath. A charge of 266.4 mL of tributyl aluminum (0.68 M in hexane) was slowly added into the bottle while kept cool.

The hydrogenation reactor, containing polymer product and catalyst was then heated to 120° C. After the temperature stabilized, the hydrogenation was initialized by charging high pressure $H_2$ gas into the reactor to about 792 kPa. After about 15 minutes, the pressure dropped as the $H_2$ began to react. The reactor was again recharged to about 792 kPa. The procedure was then repeated until the butadiene hydrogenation conversion reached about 95%, based on $H^1$ NMR analysis. The reactor was then cooled and the product dropped into isopropanol solvent. The obtained polymer particles were dried in vacuum for 2 days at 23° C.

Figure 2:
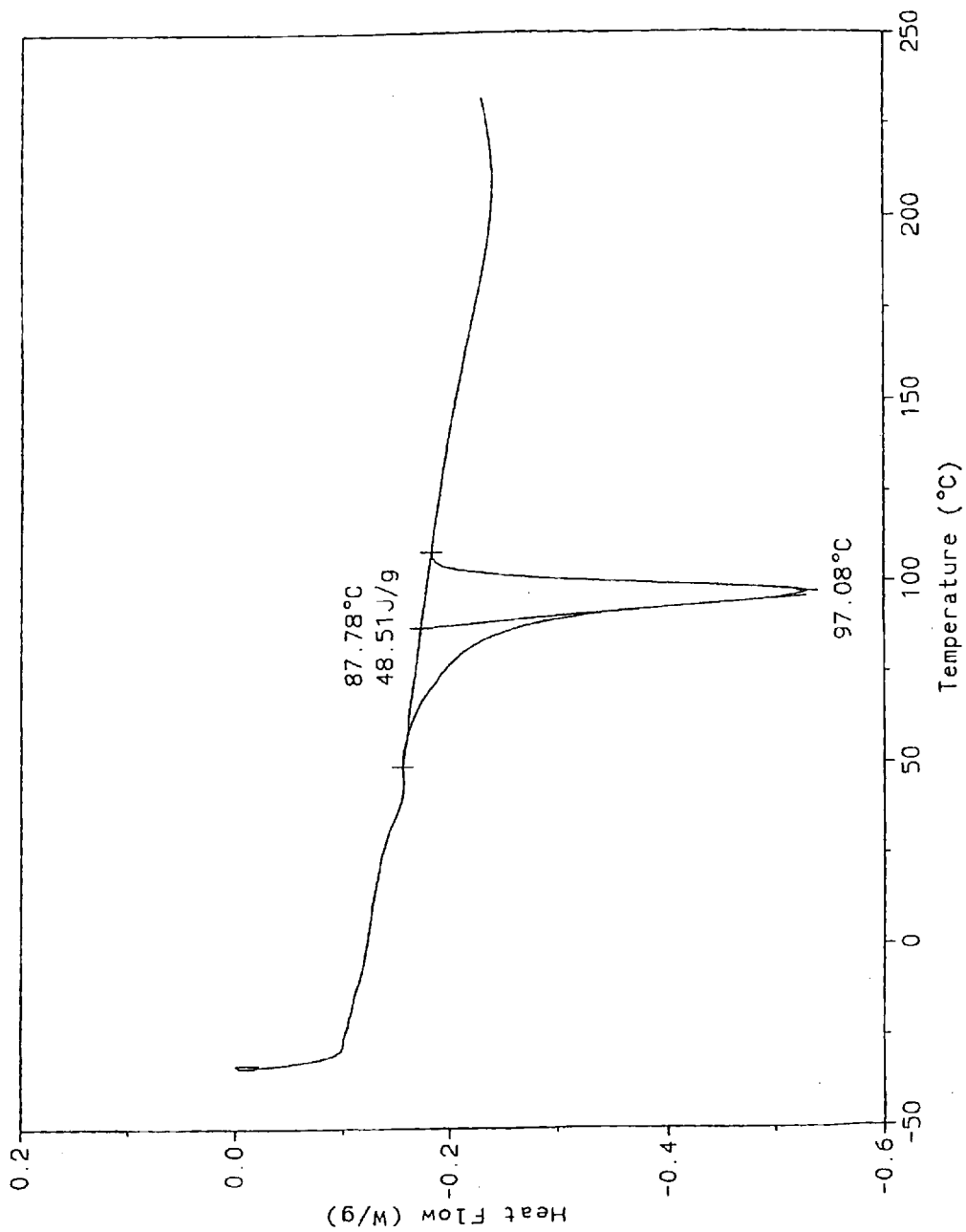
FIG. 2 is a graphical depiction of DSC analysis of the inventive nano-particles.

A small amount of the obtained polymer particles were placed in a DSC aluminum pan. Thermal analysis was performed on a TA instrument modulated DSC 2920 using a $N_2$-purged cell at a flow rate of 80 mL/min. The heat flow signal was recorded at 5° C./min. heating rate. The analysis showed that the material had a melting peak around 100° C., i.e. typical of polyethylene. FIG. 2 displays the result.

Figure 3:
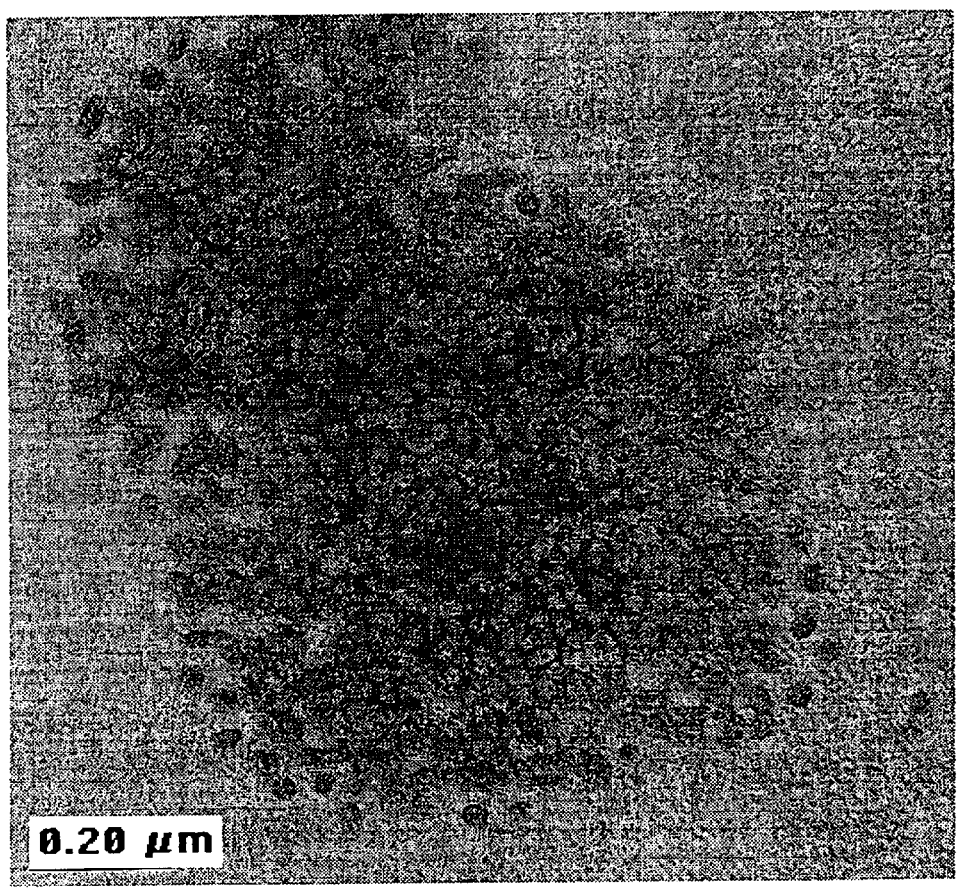
FIG. 3 is a TEM photograph of polycrystalline nano-particles formed in accordance with EXAMPLE 8.

For transmission electron microscopy (TEM) analysis, a small amount (~3 mg) of the obtained polymer particles were dispersed into about 40 mL hexane solvent using ultrasonic vibration. A drop of the solution was then coated on a graphed copper micro-screen. After the solvent was evaporized, the screen was examined by TEM. The results showed that the average particle size was ~30 nm, and the dispersity of the particle size was about 1.1. FIG. 3 shows the TEM image of the crystalline polymer nano-particles.

Example 9

The reactor was first charged with 1.5 kg of a isoprene/hexane blend that contains 14.8 wt % of isoprene. The batch was then heated to 58° C. After the temperature stabilized, polymerization was initiated with 5.4 mL of a 1.5 M solution of butyllithium in hexane. The batch temperature was maintained at 57° C. for the duration of the polymerization. After two hours (when the reaction was finished), the reactor was charged with 0.68 kg of styrene/hexane blend that contains 33 wt % of styrene. After additional two-hour reaction, the reactor was charged with 1.8 kg of hexane and the 50 mL of divinyl benzene. The reactor temperature was maintained at 57° C. for another two hours, then discharged. The product was dropped into an acetone/isopropanol (~95/5) blend and dried. GPC analysis of the product showed that the particles have a number average molecular weight ($M_n$) of 1,078,089. The polydispersity of the molecular weight is 1.14.

Example 10

The reactor was first charged with 3.8 L of a nano-particle/hexane solution containing 10 wt % of the product made in example 9. The reactor was then charged with 50 mL of Ni catalyst solution, which was made according to the procedure of example 8:

The procedure was then repeated, until the isoprene hydrogenation conversion reached 92% based on the $H^1$ NMR analysis. GPC analysis shows on $M_n$ of the hydrogenated particle of about 1,174,420, and a polydispersity of about 1.13.

TEM analysis showed an average particle size of ~30 nm, and a polydispersity of about 1.1.

Examples 11–18

Application of Hydrogenated Nano-Particles in Rubber Formulations

Eight kinds of rubber compositions were prepared according to the formulation shown in Table 5, selectively using the synthesized polymer particles (i.e., example 10) to replace the amount of EPDM (Vistalon 6505, Exxon Chemicals) or the paraffin oil (PW380) in the compound formulation. In each sample, a blend of the ingredients was kneaded by a method listed in Table 5. The final stock was sheeted and molded at 160° C. for 30 minutes.

As shown in Table 6, the test compounds exhibited very well balanced physical properties. The tensile strength of the rubbers containing the inventive nano-particles is better than that of the comparative compounds.

TABLE 5

Rubber Formulations

|  | Example | | | | | | | |
|---|---|---|---|---|---|---|---|---|
|  | 11 | 12 | 13 | 14 | 15 | 16 | 17 | 18 |
| EPDM (g) | 40 | 35 | 30 | 35 | 30 | 40 | 40 | 40 |
| Nano-particles (from Example 8) |  | 5 | 10 | 5 | 10 | 5 |  |  |
| Paraffin Oil (g) | 5 | 5 | 5 | 0 | 0 | 0 | 5 | 5 |
| Sulfur (g) | 1.2 | 1.2 | 1.2 | 1.2 | 1.2 | 1.2 | 1.5 | 1.8 |
| Zinc oxide (g) | 1.2 | 1.2 | 1.2 | 1.2 | 1.2 | 1.2 | 1.2 | 1.2 |
| Stearic acid (g) | 0.8 | 0.8 | 0.8 | 0.8 | 0.8 | 0.8 | 0.8 | 0.8 |
| Benzothiazyl disulfide (g) | 1 | 1 | 1 | 1 | 1 | 1 | 1 | 1 |

TABLE 5-continued

Rubber Formulations

Mixing Procedure: at 75° C.

Master Batch

| 0 sec | polymer (EPDM) charged |
| 30 sec | oil and nanopolymer charged |
| 5 min | drop |

Final Batch

| 0 sec | master batch charged |
| 30 sec | sulfur and other pigments |
| 1.5 min | drop |

TABLE 6

Experimental Results

|  | Example | | | | | | | |
|---|---|---|---|---|---|---|---|---|
|  | 11 | 12 | 13 | 14 | 15 | 16 | 17 | 18 |
| Tensile Strength Tb (kPa) | 1524 | 2808 | 4755 | 3084 | 4388 | 3218 | 3417 | 1286 |
| Elongation at breaking (%) | 674.6 | 923.1 | 1487.6 | 743.2 | 772.7 | 964.5 | 217.5 | 376.0 |
| Modulus at 35% elongation (kPa) | 171 | 228 | 362 | 314 | 518 | 276 | 179 | 185.2 |
| Hysteresis tan δ (23° C.) | 0.13507 | 0.14365 | 0.15493 | 0.13145 | 0.11847 | 0.12255 | 0.13406 | 0.1301 |
| Mooney Viscosity | 23.3 | 24 | 26.3 | 23.5 | 23.9 | 26.4 | 24.9 | 24.1 |

Example 19

Synthesis of EPR-ST Nano-Particles

A 4 L polymerization reactor was used for the preparation. The reactor was first charged with 3.8 L of the nano-particle/hexane solution of example 9. The solution contained 10 wt % of the product made in example 9. The reactor was charged with 50 ml of a Ni catalyst solution, which was made according to the procedure of example 8:

The procedure was repeated until the isoprene hydrogenation conversion reached to 69%, based on the $H^1$ NMR analysis. GPC analysis show that the number average weight of the hydrogenated particle is about 1,216,800, and the dispersity index is about 1.12.

Example 20

The procedure used in Example 19 was repeated. In comparison to example 19, more $H_2$ charges were implemented, resulting in a hydrogenation conversion of about 89% based on the NMR analysis. GPC analysis show a number average molecular weight of the particle is about 122,700, and a dispersity index of about 1.13.

Examples 21–23

Application of EPR-ST Nano-particles in Gel Compounds

Four kinds of gel compositions were prepared according to the formulation shown in Table 7 by selectively using the synthesized particles of example 20 to replace the amount of SEPS (Septon 4077, Kuraray Chemicals, Tokyo JP) in the compound formulation (i.e., examples 22 and 23). One control was used (i.e., example 21) for setting up a comparison with the test compounds. In each sample, a blend of the ingredients was kneaded by a method listed in Table 8. The final stock was sheeted and molded at 160° C. for 30 minutes.

TABLE 7

| | Example 19 | Weight (g) | Stepton 4077 (SEPS) | Weight (g) | | Weight (g) | Sum |
|---|---|---|---|---|---|---|---|
| Example 21 | 0% | 0 | 25% | 12.5 | 75% | 37.5 | 100% |
| Example 22 | 10% | 5 | 23% | 11.25 | 68% | 33.75 | 100% |

| | Example 20 | Weight (g) | Stepton 4077 | Weight (g) | | PW380 Weight (g) | Sum |
|---|---|---|---|---|---|---|---|
| Example 23 | 10% | 5 | 23% | 11.25 | 68% | | 100% |

TABLE 8

Mixing Procedure:

1) Septon, particles and Oil were by hand mixed first, and the mixture then was allowed to soak at room temperature for over night.
2) On the next day the mixture was charged into a 55 g N2-purged brabender mixer by using roller blades. The temperature of the mix was set to 180° C., and the speed was 60 rpm. In addition, 0.5 g of antioxidant (Santoflex 13) was added to the mixture.
3) The material was then mixed at those conditions for 20 minutes; after then, the agitation was turned off and the mixture was removed from the mixer.

As shown in Table 9, the test Examples 22 and 23 exhibited balanced physical properties. The tensile strength is better than that of the comparative compounds (i.e., example 21), though the test compound contained less of the matrix polymer. It is also noteworthy that the test compounds have a higher tan δ and better compression set values.

TABLE 9

Experimental Results

| Example | C.S at 100° C. | Tb/Eb (kPa %) | Tan δ (at 25° C.) | Shore A (at 25° C.) |
|---|---|---|---|---|
| Example 21 | 73.5% | 1,212/1223 | 0.0590 | 4 |
| Example 22 | 48.0% | 2,274/1220 | 0.1279 | 4 |
| Example 23 | 54.2% | 1,585/1206 | 0.1352 | 4 |

Example 24

Synthesis of Functionalized Nano-Particles

Figure 4:
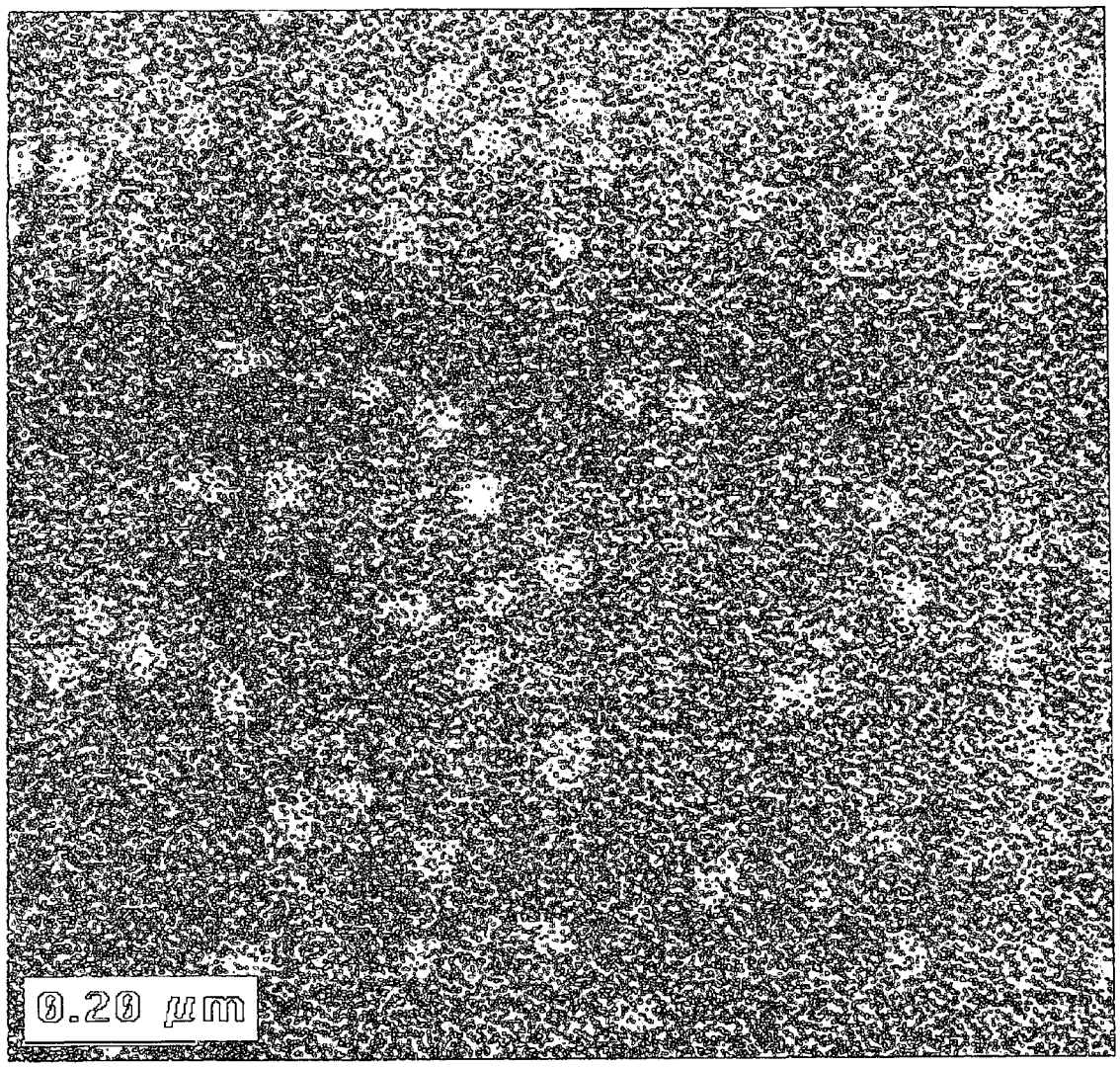
FIG. 4 is a TEM photograph of amine-functionalized nano-particles formed in accordance with EXAMPLE 24.
Figure 5:
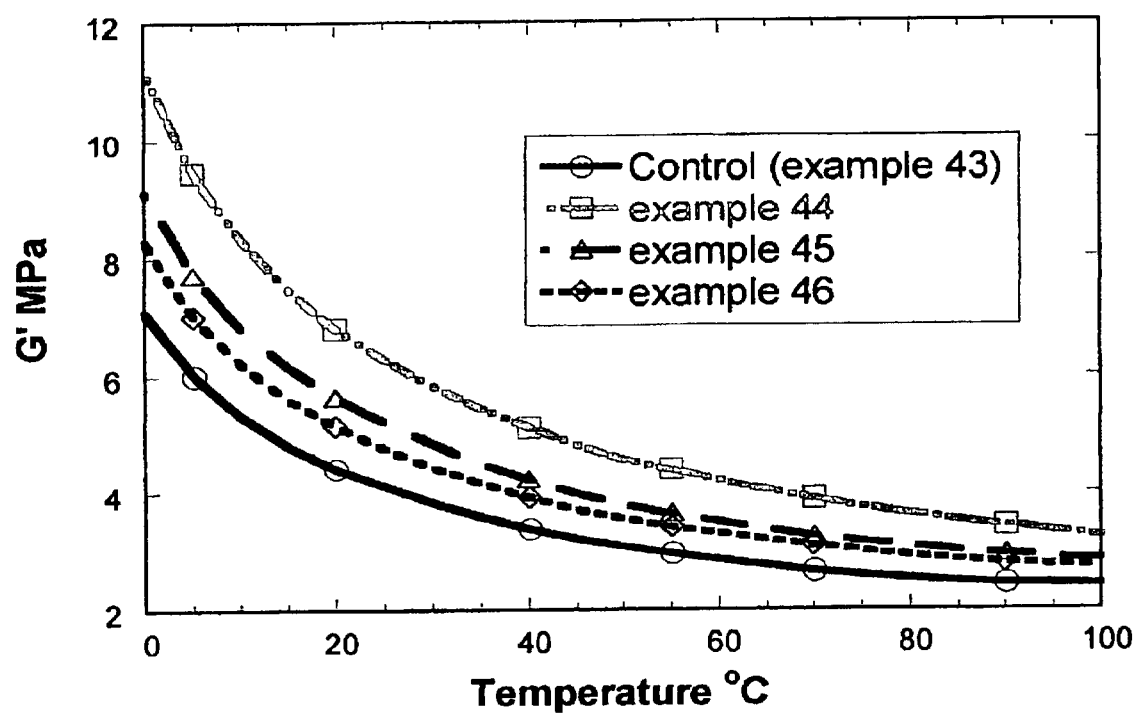
FIG. 5 is a graphical depiction of G' temperature dependence in accord with EXAMPLES 43–46.

The reactor was first charged with 508 g hexane. Then, the reactor was charged with 1.04 kg of butadiene/hexane blend that contains 21.6 wt % of butadiene. The batch was then heated to 57° C. After the temperature stabilized, polymerization was initiated with 6.3 mL of a 1.3 M solution of HMI-Pr-lithium in hexane. The reactor batch temperature was then maintained at 57° C. for the duration of the polymerization. After 2 hours (when the reaction was finished), the reactor was charged with 680 g if styrene/hexane blend that contains 33 wt % of styrene. After additional two-hour reaction, the reaction was charged with 1.8 kg of hexane, then 50 mL of divinyl benzene. The reactor was maintained at 57° C. for another two hour period, and the reactor was then discharged. The product was dropped into acetone/isopropanol (~95/5) blend, and dried. GPC analysis of the product showed that the molecular weight ($M_w$) of the particle polymer is 1,226,900. The polydispersity of the segment is 1.09. The particles are also examined by transmission electron microscopy (TEM). The results showed that the average particle size was ~35 nm, and the dispersity of the particle size was about 1.1 (See FIG. 4).

Example 25

The experiment and the procedure of Example 24 were repeated. In this experiment, the reactor was charged with 8.53 ml of 0.95 M solution of HMI-Pr-lithium in hexane. GPC analysis of the product showed that the molecular weight ($M_w$) of the particle polymer is 1,259,000. The polydispersity of the segment is 1.12. The particles were also examined by transmission electron microscopy (TEM). The results showed that the average particle size was ~40 nm, and the dipersity of the particle size was about 1.1.

Example 26

The reactor was first charged with 508 g of hexane. Then, the reactor was charged with 1.03 kg of butadiene/hexane blend that contains 21.8 wt % of butadiene. The batch was then heated to 57° C. After the temperature stabilized, polymerization was initiated with 5.53 mL of a 0.95 M solution of HMI-Pr-lithium in hexane. The reactor batch temperature was then maintained at 57° C. for the duration of polymerization. After 2 hours (when the reaction was finished), the reactor was charged with 340 g of styrene/hexane blend that contained 33 wt % if styrene. After additional two-hour reaction, the reactor was charged with 1.8 kg hexane, then 50 mL of divinyl benzene. The reactor was maintained at 57° C. for another two-hour period, and the reactor was then discharged. The product was droped into acetone/isopropanol (~95/5) blend, and dried. GPC analysis of the product showed that the molecular weight ($M_w$) of the particle polymer is 1,475,600. The polydipersity of the segment is 1.11. The particles were also examined by TEM, demonstrating, an average particle size of ~40 nm, and a dispersity of about 1.1.

Example 27

The reactor was first charged with 517 g of Hexane. Then, the reactor was charged with 517 g of butadiene/hexane blend that contains 21.8 wt % of butadiene. The batch was then heated to 57° C. After the temperature stabilized, polymerization was initiated with 8.53 mL of a 0.95 M solution of HMI-Pr-lithium in hexane. The reactor batch temperature was then maintained at 57° C. for the duration of the polymerization. After 2 hours (when the reaction was finished), the reactor was charged with 680 g of styrene/hexane blend that contains 33 wt % of styrene. After an additional two-hour reaction, the reactor was charged with 1.8 kg of hexane, then 50 mL of divinyl benzene. The reactor was maintained at 57° C. for another two hour period, and the reactor was then discharged. The product was dropped into acetone/isopropanol (~95/5) blend, and dried. GPC analysis of the product showed that the molecular weight ($M_w$) of the particle polymer is 1,079,000. The polydispersity of the segment is 1.10. TEM analysis showed that the average particle size was ~30 nm, and the dispersity of the particle size was about 1.1.

Example 28

The reactor was first charged with 227 g of hexane. Then, the reactor was charged with 1.5 kg of Isoprene/hexane blend that contains 15 wt % of butadiene. The batch was then heated to 57° C. After the temperature stabilized, polymerization was initiated with 5.4 mL of a 0.95 M solution of HMI-Pr-lithium in hexane. The reactor batch temperature was then maintained at 57° C. for the duration of the polymerization. After 2 hours (when the reaction was finished), the reactor was charged with 680 g of styrene/hexane blend that contains 33 wt % of styrene. After additional two-hour reaction, the reactor was charged with 1.8 kg of hexane, then 50 mL of divinyl benzene. The reactor was maintained at 57° C. for another two hour period, and the reactor was then discharged. The product was dropped into acetone/isopropanol (~95/5) blend, and dried. GPC analysis of the product showed that the molecular weight ($M_w$) of the particle polymer is 1,552,600. The polydispersity of the particle size was about 1.1.

Examples 29–30

Application of Nano-Particles in Silica Formulations

Two kinds of rubber compositions were prepared according to the formulation shown in Tables 10 and 11 by selectively adding the synthesized polymer particles (i.e., example 24) to the rubber compound formulation. In each sample, a blend of the ingredients was kneaded by a method listed in Table 12. The final stock was sheeted and molded at 160° C. for 15 minutes.

As shown in the Table 13, the test compounds exhibited balanced physical properties. The shrinkage of the test compound is better than that of the comparative compound.

TABLE 10

Composition for Master Batch

| Component | pbw |
| --- | --- |
| Emulsion SBR 0120 (35%St, 37.05% aromatic oil) | 96.25 |
| Emulsion SBR 1712 (23%St, 37.05% aromatic oil) | 41.25 |
| Carbon Black | 41.00 |
| AQ Silica | 34.00 |
| Stearic Acid | 2.00 |
| Wax | 1.50 |
| N-(1,3-dimethyl-1-butyl)-N'-phenyl-p-phenylamine (antioxidant) | 1.00 |
| Disulfide polysulfane (coupling agent Si75) | 2.60 |

TABLE 11

Composition for Final Batch

| Additional components added after Master Batch formation | pbw |
| --- | --- |
| Sulfur | 1.80 |
| Zinc Oxide | 2.00 |
| Polymerized 2,2,4-trimethyl-1,2-dihyfroquinoline (antioxidant) | 0.20 |
| Diphenylguanidine (accelerator) | 1.00 |
| N-cyclohexyl-2-benzothiazyl-sulfenemide (accelerator) | 1.00 |
| Tetra-octylthiuramdisulfide (accelerator) | 0.50 |

TABLE 12

Mixing Conditions

| Master Batch Stage | |
| --- | --- |
| Mixer: 300 g Brabender | Agitation Speed: 60 rpm |
| Initial Temperature | 110° C. |
| 0 minutes | charging polymers |
| 0.5 minutes | charging oil and Carbon Black |
| 5.0 minutes | drop |
| Remail Stage | |
| Mixer: Double Roller Mill | Speed: 70 rpm |
| Initial Temperature | 110° C. |
| 0 seconds | master stock |
| 60 seconds | drop |
| Final Batch Stage | |
| Mixer: 300 g Brabender | Agitation Speed: 60 rpm |
| Initial Temperature | 80° C. |

TABLE 12-continued

Mixing Conditions

| | |
|---|---|
| 0 seconds | charging master stock, curing agent and accelerators |
| 60 seconds | diop |

TABLE 13

Experimental Results

| | Example | |
|---|---|---|
| | 29 | 30 |
| Polymer tested | Example 24 | 4.2 |
| Shrinkage(%) | | |
| 1 min | 26.7 | 25.0 |
| 3 min | 26.7 | 25.0 |
| 30 min | 28.3 | 25.8 |
| 17 hour | 30.8 | 27.5 |
| Shore A Hardness | 62 | 63 |
| Tensile strength (at 23° C.) | | |
| Tb (Pa) | 25.5 | 24.2 |
| Eb (%) | 564 | 543 |
| Modulus at 300% (Pa) | 10.1 | 10.4 |
| Modulus at 100% (Pa) | 1.9 | 1.9 |
| Tensile strength (at 100° C.) | | |
| Tb (Pa) | 9.6 | 9.3 |
| Eb (%) | 342 | 342 |
| Modulus at 300% (Pa) | 8.1 | 7.8 |
| Modulus at 100% (Pa) | 1.6 | 1.6 |
| Dynamic Modulus | | |
| G' at 50° C. (tested at 10 Hz and 0.3% strain) (unit: Pa) | 6.82 | 6.98 |
| tan δ | 0.129 | 0.133 |

Example 31

Synthesis of Crystalline Nano-Particles

The reactor was first charged with 508 g hexane, then was charged with 1.0 kg of butadiene/hexane blend that contained 21.6 wt % butadiene. The batch was then heated to 57° C. After the temperature had stabilized, polymerization was initiated with 5.4 mL of a 1.5 M solution of butyllithium in hexane. The batch temperature was maintained at 57° C. for the duration of the polymerization. After 2 hours (when the reaction was finished) the reactor was charged with 680 g of styrene/hexane blend that contained 33 wt % styrene. After an additional 2-hour reaction, the reactor was charged with 1.8 kg of hexane and 50 mL of divinyl benzene. The reactor was maintained at 57° C. for another 2-hour period, and a small amount of the product was taken for GPC analysis. The GPC analysis of the product showed that the polymer had a number average molecular weight ($M_n$) of 826,559. The polydispersity of the molecular weight was 1.10. The conversion of the reaction was about 100%.

Example 32

A 4 L hydrogenation reactor was used for the preparation. 2.04 kg of the product of example 31 was transferred to the reactor. Then, the reactor was charged with 75 mL of a Ni catalyst solution, which was made according to the following procedure of example 8.

The procedure was repeated until the butadiene hydrogenation conversion reached about 95% based on the $H^1$ NMR analysis. The reactor was then cooled and the product was dropped into isopropanol solvent. The nano-particles were then dried in a vacuum for 2 days at 23° C. A small amount of the polymer material was put into a DSC aluminum pan. Thermal analysis was performed on a TA instrument modulated DSC 2920 using a $N_2$ purged cell at a flow rate of 80 mL/min. The heat flow signal was recorded at a 5° C./min heating rate. The analysis showed that the material had a melting peak around 100° C., that indicated the typical polyethylene melting peak. TEM analysis showed that average particle size was ~20 nm and the dispersity of the particle size was about 1.1.

Examples 33–38

Application of Crystalline Nano-Particles in

Soft Rubber Compounds

The soft compound formulations are listed in the following table. The Septon 4077 was premixed with the oil and was then set at room temperature overnight. The compounding process was performed using a 50 g Brabender mixer. The mixer was installed with roller blades and a $N_2$ purging system. The temperature was set at 180° C. After adding all of the components, the mixer was operated at 60 rpm. The mixing was continued for 20 minutes, before the product was taken out. The material was then molded into sheets and cylinder buttons at ~160° C. Ring samples were cut from these sheets for tensile measurements. The cylinder buttons were used for compression set (CS) measurements.

A well-dispersed Example 32 through the gel matrix has been achieved as seen under optical microscopy examination. The compounds have well balanced properties that are required for hard disk drive applications. Especially, the CS value (e.g. that for examples 34 and 36) is largely improved, as compared with the comparative example 33. The results of examples 35 and 38 demonstrate that using the product of example 32 alone or using polypropylene (pp) alone may not achieve the desired properties.

TABLE 18

Experimental Results

| Example | Septon 4077 (g) | Ex. 32 | pp (g) | PW 380 (g) | Tb/Eb (kPa/%) | CS (100° C.) | tan δ (23° C.) | Shore A |
|---|---|---|---|---|---|---|---|---|
| 33 | 12.50 | 0 | 0 | 37.50 | 1,213/1223 | 73.8% | 0.06 | 4 |
| 34 | 1.25 | 5.00 | 0 | 33.75 | 3039/1121 | 51.9%% | 0.12 | 14 |
| 35 | 10.00 | 10.00 | 0 | 30.00 | 3197/896 | 75.2% | 0.20 | 27 |
| 36 | 11.25 | 2.50 | 2.50 | 33.75 | 3314/1135 | 35.3 | 0.11 | 17 |
| 37 | 10.00 | 5.00 | 5.00 | 30.00 | 3121/899 | 48.9% | 0.18 | 38 |
| 38 | 10.00 | 0 | 10.00 | 30.00 | 3094/605 | 55.9% | 0.16 | 50 |

Examples 39–42

Synthesis of SBR-PS Nano-Particles

All of the polymers were prepared by anionic polymerization in hexane through three stages. In the first stage, butadiene (BD) and styrene (ST) were charged into the reactor, the polymerization was initiated with butyl lithium (BuLi) and the microstructure was controlled by adding oligomeric oxolanyl propane polar randomizer (OOPS). The polymer molecular weight (MW) was controlled by adjusting the ratio of the monomers and level of initiator used. After nearly all of the monomers were consumed in the first stage, additional styrene was charged for polymerization for certain period of time to form the micelle core in the second stage. The $M_w$ of the core was adjusted to be about 25,000 in every micelle polymer listed here. 50 ml of divinyl benzene (DVB) was then charged into the reactor in the third stage to crosslink the micelle core. The stoichiometry of the initiator, modifier, monomers, and DVB used to prepare these micelle polymers are detailed in Table 19. The polymerization temperature was maintained at about 57° C. throughout the polymerization. All of the polymers were isolated by the addition of a mixture of acetone and isopropanol in a volume ratio of 95% to 5%. t-Butyl-2-hydroxy toluene (BHT) was then added into the polymer as an antioxidant.

The characterization of these polymers including $M_w$, polydispersity, polymer microstructure, and $T_g$ are tabulated in Table 20.

TABLE 20

Characterization data of the micelle SBR-PS polymers

| | Example | | | |
|---|---|---|---|---|
| | 39 Comparative | 40 | 41 | 42 |
| $M_w$ of the polymer | | 53,900 | 102,400 | 115,720 |
| $M_w$ of single PS chain in micelle hard core | N/A | 25,000 | 25,000 | 25,000 |
| polydispersity | | 1.09 | 1.12 | 1.10 |
| Size of PS domain | N/A | 35 nm | 35 nm | 35 nm |
| % Styrene | 23.5 | 60.6 | 46.5 | 42.4 |
| % Vinyl | 47 | 19.4 | 26.8 | 22.5 |
| $T_g$ ° C. | −36 | −36 and 65 | −35 and 74 | −45 and 86 |

Examples 43–46
Compounding of SBR-PS Micelle Polymers
Rubber Compound Preparation Four stocks of rubbers were prepared using the formulation and mixing conditions shown in Tables 21 and 22. 10 phr of SBR Duradiene 715 (Firestone Polymer Company) was used to prepare example 44, the control stock. In

TABLE 19

Stoichimetry of the initiator, modifier, monomers, and DVB employed for the Polymerization Process

| | Polymerization Stage | | | | | |
|---|---|---|---|---|---|---|
| | 1st Stage | | | | 2nd Stage | 3rd Stage |
| | 1.5 M BuLi (mL) | 1.6 M OOPS (mL) | 22 wt % BD in hexane, (kg) | 33 wt % ST in hexane, (kg) | 33 wt % ST in hexane, (kg) | DVB (mL) |
| SBR-PS-1 (Example 40) | 5.4 | 2.1 | 0.17 | 1.03 | 0.68 | 50 |
| SBR-PS-2 (Example 41) | 2.7 | 1.1 | 0.17 | 1.03 | 0.34 | 50 |
| SBR-PS-3 (Example 42) | 2.0 | 0.5 | 0.17 | 1.03 | 0.25 | 50 | examples 44–46, 10 phr of Duradiene 715 was replaced with the SBR-PS micelle polymers. The composition of the polymers used for all of examples is listed in Table 23. The final example was sheeted and then subsequently molded at 171° C. for 15 minutes.

TABLE 21

Formulation used to prepare the rubber compounds

| Component | phr |
|---|---|
| SBR (Duradiene 715) | varied |
| SBR-PS nano-particle | varied |
| Carbon Black (SAF) | 41.00 |
| Wax | 1.00 |
| Antioxidant [N-(1,3 dimethylbutyl)-N'-phyenyl-p-phenylene-diamine] | 0.95 |
| Sulfur | 1.30 |
| Stearic acid | 2.00 |
| Accelerator [N-cyclohexyl-2-benzothiasole-sulfenamide] | 1.70 |
| Diphenyl guanidine | 0.20 |
| Zinc oxide | 2.50 |

TABLE 22

The mixing conditions used to prepare the rubber compounds

| Mixer | 310 g Brabender |
|---|---|
| Agitation Speed | 60 rpm |
| | Mater Batch Stage |
| Initial Temperature | 100° C. |
| 0 sec | charging polymers and micelle polymers (if added) |
| 30 sec | charging carbon black and all pigments |
| 5 min | drop |
| Drop temperature | 170° C. |
| | Remill 1 Batch Stage |
| Initial Temperature | 70° C. |
| 0 sec | charging remilled stock |
| Drop Temperature | 145° C. |
| | Final Batch Stage |
| Initial Temperature | 90° C. |
| 0 sec | charging remilled stock |
| 30 sec | charging curing agent and accelerators |
| Drop Temperature | 105° C. |

TABLE 23

SBR and SBR-PS used to prepare examples 43–46

| Example | SBR phr | 40 (phr) | 41 (phr) | 42 (phr) |
|---|---|---|---|---|
| 43 (control) | 100 | 0 | 0 | 0 |
| 44 | 90 | 10 | 0 | 0 |
| 45 | 90 | 0 | 10 | 0 |
| 46 | 90 | 0 | 0 | 10 |

Processing Evaluation:

The processing of the rubber compound was evaluated by examining the compound Mooney and scorch data along with the curing characteristic data. The Mooney viscosity and the curing characteristics of the uncured stocks are shown in Table 24. Mooney viscosity measurement was conducted at 130° C. using a large rotor. The Mooney viscosity was recorded as the torque when rotor has rotated for 4 minutes. The sample is preheated at 130° C. for 1 minute before the rotor starts. $T_5$ is the time required to increase 5 Mooney units during the Mooney-scorch measurement such as extrusion process. $T_{52}$ and $T_{90}$ are the time when torque rises to 2% and 90% of the total torque increase during curing characterization experiment at 171° C. They are used to predict how fast the viscosity build-up ($T_{52}$) and the curing rate during the curing process.

TABLE 24

The Mooney scorch and curing characteristics of the green stocks

| Stock No. | $ML_{1+4}$ @ 130° C. | $T_5$ scorch @ 130° C. minutes | $T_{52}$ @ 171° C. minutes | $T_{90}$ @ 171° C. minutes |
|---|---|---|---|---|
| 43 (control) | 50 | 20.8 | 2.64 | 5.13 |
| 44 | 49 | 22.3 | 2.80 | 5.34 |
| 45 | 49 | 22.1 | 2.75 | 5.36 |
| 46 | 50 | 21.9 | 2.73 | 5.20 |

The compound $ML_{1+4}$, Scorch $T_5$, $T_{52}$ and curing characteristics of examples 44–46 were found to be comparable to the control example (43). It is apparent that addition of SBR-PS polymer in a rubber compound will not affect the processing. Therefore it is not expected to encounter apparent processing problems with these examples containing SBR-PS nano-particles.

Mechanical Properties:

1. Tensile Mechanical Properties

The tensile mechanical properties of examples 43–46 are listed in Table 25. The tensile mechanical properties were measured using the standard procedure described in the ASTM-D-412 at 25° C. The tensile test specimens are round rings with a dimension of 0.127 cm (0.05 inches) in width and 0.19 cm (0.075 inches) in thickness. A specific gauge length of 2.54 cm (1.0 inches) is used for the tensile test.

TABLE 25

Tensile mechanical properties at 25° C.

| Example | M50 (kPa) | M300 (kPa) | Strength, Tb (kPa) | Elongation at break, Eb, % | Toughness (kPa) |
|---|---|---|---|---|---|
| 43 (control) | 1,226 | 12,829 | 13,780 | 316 | 17,714 |
| 44 | 1,598 | 14,152 | 17,501 | 353 | 26,623 |
| 45 | 1,530 | 15,034 | 18,079 | 344 | 25,796 |
| 46 | 1,323 | 12,988 | 17,507 | 371 | 26,974 |

Improvements on the tensile mechanical properties including 50% Modulus, M50, (8%–30%), elongation at break (9%–17%), tensile strength (19%–31%), and tensile toughness (30%–52%) by partially replacing SBR with SBR-PS are evident. The tensile mechanical properties obtained from dumbbell shape samples also confirm the above ring tensile mechanical property results. (See Table 26).

TABLE 26

Tensile mechanical properties at 25° C. obtained from tensile test on dumbbell-shape samples

| Example | M50 (kPa) | M300 (kPa) | Strength, Tb (kPa) | Elongation at break, Eb, % | Toughness (kPa %) |
|---|---|---|---|---|---|
| 43 (control) | 1,585 | 10,769 | 15,372 | 414 | 30,006 |
| 44 | 1,888 | 12,188 | 15,613 | 374 | 27,753 |
| 45 | 1,729 | 11,844 | 17,390 | 418 | 33,506 |
| 46 | 1,695 | 11,417 | 18,203 | 448 | 37,743 |

2. Tensile Mechanical Properties upon Thermal Aging

The tensile mechanical properties were further examined on the thermally aged samples. Samples were thermally aged at 100° C. for 24 hours. These results are shown in Table 27. Although all of the mechanical properties upon aging were degraded, it was found that the mechanical properties of SBR-PS added stocks are still superior to the control stock.

TABLE 27

Tensile mechanical properties at 25° C. after thermal aging

| Stock No. | M50 (kPa) | M300 (kPa) | Strength, Tb (kPa) | Elongation at break, Eb, % | Toughness (kPa %) |
|---|---|---|---|---|---|
| 43 (control) | 1,350 | N/A | 14,283 | 283 | 16,143 |
| 44 | 1,640 | N/A | 16,150 | 298 | 20,704 |
| 45 | 1,454 | 15,709 | 16,240 | 300 | 20,064 |
| 46 | 1,474 | 16,426 | 17,563 | 314 | 22,737 |

3. Tear Mechanical Properties

The tear strengths of the rubbers measured at a temperature of 23° C. along with the elongation at break ($E_b$) data are listed in Table 28. The tear strengths of the Vulcanized stocks were measured using the procedure following the ASTM-D 624 at 23° C. Test specimens are nicked round rings with a dimension of 0.635 cm (0.25 inches) in width, 0.254 cm (0.10 inches) in thickness, and 44 mm and 57.5 mm in inside and outside diameters. The specimen was tested at the specific gauge length of 4.445 cm (1.750 inches). With the partial replacement of SBR with the SBR-PS, the tear strength is improved by about 10%.

TABLE 28

Measured Tear Properties at 25° C.

| Example | Tear Strength (kPa-m) | Elongation at break, Eb, % |
|---|---|---|
| 43 (control) | 37.9 | 243 |
| 44 | 40.76 | 219 |
| 45 | 43.97 | 242 |
| 46 | 40.94 | 240 |

4. Tire Performance Predicted Based on the Measured Dynamic Mechanical Properties The dynamic viscoelastic properties of cured stocks are listed in Table 29 where 0° C. and 50° C. tan 67 data were obtained from temperature sweep experiments. Temperature sweep experiments were conducted with a frequency of 31.4 rad/sec using 0.5% strain for temperature ranging from −100° C. to −10° C., and 2% strain for the temperature ranging from −10° C. to 100° C. Payne effect (ΔG') and tan δ at 5% strain were obtained from the strain sweep experiment. A frequency of 3.14 rad/sec was used for a strain sweep test which was conducted at 65° C. with strain sweeping from 0.25% to 14.75%.

Rubber compounds containing the SBR-PS show the increased G' (20%–53%) over the entire temperature range measured. These results are graphically depicted in 5. The G' temperature dependence in these PS-SBR containing stocks except example 44 is parallel to that of the control 43. This G' enhancement, however, decreases as the $M_w$ of the SBR chain in SBR-PS polymers increases, decreasing the presence of the hard core. In spite of this, 20% improvement in G' in a compound containing the micelle polymer with the highest $M_w$ SBR brush (example 46) was observed. The higher G' of the tire tread is predicted to provide the tire with better cornering and handling. Although the examples with shorter SBR chain enhance the compound G' more effectively, its high temperature hysteresis also increases. This is due to the fact that the longer SBR chains in the PS-SBR nano-particles used for compounds leads to better mixing or entanglement and a higher degree of co-curing between the polymer matrix and nano-particle resulting in lower high temperature hysteresis. Example 42 containing the longest SBR chains of the chosen PS-SBR listed here, provides the rubber compounds with the G' enhancement without sacrificing other properties such as snow traction (−20° C. G'), wet traction (0° C. tan δ), and rolling resistance (50° C. tan δ and 65° C. tan δ).

5. Filler Dispersion and Wet Skid Resistance:

One of the main concerns of the rubber properties is the dispersion of the filler. We tabulated the filler dispersion index along with wet skid resistance data in Table 30. The dispersion rating was evaluated using the Federal Surface System 2000 based on the procedure described in the Test Method C-Microroughness Measurement in ASTM-D 2663-89. A rectangular cured rubber with a dimension approximately 3.5 cm long, 2-cm wide, and 0.2 cm deep was cut out using a fresh razor. The surface roughness of the sample surface was traced by the stylus, and the surface contour such as the high and low of the peak, number of roughness peaks/cm, F, average roughness peak height, H, and roughness factor, $F^2H$ were recorded. The dispersion indices (DI) were then calculated according to equation 1.

$$DI\# = 100 - \exp[\log_{10}(F^2H) \times A + B] \qquad \text{Equation 1:}$$

Where A=0.568225; B=1.08002: A and B are constants derived from the Method B in ASTM-D 2663-89.

Wet traction of rubber was evaluated using the British Portable Skid Tester (BPST). The details of the BPST are described in ASTM E-303, Vol. 04.03. It is a portable device in which the specimen is attached to the base of a pendulum

TABLE 29

The viscoelastic properties measured by temperature and strain sweeping from 0.25% to 14.75%

| Example | tan δ @ 0° C. (TS) | tan δ @ 50° C. (TS) | G' Mpa @ −20° C. (TS) | G' Mpa @ 50° C. (TS) | ΔG' Mpa 65° C. | tan δ @ 5% strain 65° C. (SS) |
|---|---|---|---|---|---|---|
| 43 (control) | 0.3987 | 0.1735 | 53 | 3.0 | 0.64 | 0.1297 |
| 44 | 0.3980 | 0.2032 | 72 | 4.6 | 1.28 | 0.1594 |
| 45 | 0.3996 | 0.1834 | 63 | 3.8 | 0.82 | 0.1365 |
| 46 | 0.3916 | 0.1769 | 54 | 3.6 | 0.70 | 0.1289 | arm and contacts the opposing surface during a swing of the pendulum. The weighted pendulum head is free to move vertically on the pendulum arm so that the swing amplitude is determined the friction of the rubber against the pavement surface. The lower amplitude that pendulum swing up after contacting the surface (recorded as a higher value on the scale of the tester), the higher friction of the rubber against the surface. This instrument is very well adapted to testing the wet traction of the rubbers.

TABLE 30

The dispersion index (DI) and wet skid resistance (BPST) data

| Example | DI | BPST |
|---|---|---|
| 43 (control) | 92.7 | 63 |
| 44 | 91.3 | 61 |
| 45 | 98.2 | 63 |
| 46 | 95.3 | 63 |

With the use of SBR-PS polymer in rubber compounds, the filler dispersion and BPST are either equivalent or better than the control stock.

The use of SBR-PS nano-particles in rubber compounds enhanced the mechanical properties. These include tensile modulus, elongation at break, tensile strength, and toughness, and tensile tear. The dynamic storage modulus G' was also improved without increasing its G' temperature dependence. However, it is apparent that the Mw of the SBR chain in the SBR-PS nano-particles has to be high enough in order to entangle or co-cure well with the polymer matrix in order to reduce the high temperature hysteresis and to attain the favorable tire performance such as wet traction, snow traction, rolling resistance.

Example 47

Synthesis of Sn-functionalized Nano-Particles

An 8 L reactor was used to prepare the PS-BR-Sn nano-particles. Butadiene in hexane (blend 22, 21.8 wt % butadiene), styrene in hexane (33 wt % styrene), hexane, tributyltinlithium (0.77 M) and BHT were used as supplied. Technical grade divinylbenzene (80%, mixture of isomers, purchased from Aldrich, Milwaukee, Wis.) was stored on alumina beads (to remove the inhibitor) and calcium hydride under $N_2$.

The reactor was charged with 544 g hexane and 1.06 kg butadiene blend B-22. The jacket of the reactor was heated to 74° C. When the batch reached 70° C., 9.0 mL of 0.77 M tributyltinlithium were added, diluted with about 20 mL of hexane. The polymerization exothermed at 94° C. after 4 minutes of reaction. After an hour, a 200 mL sample was dropped for analysis. 680 g of styrene blend was added to the reactor, with maintenance of the jacket temperature at 74° C. An exotherm peak was observed at 92° C. after 4 minutes. After 20 minutes, 1.8 kg hexane was added, in order to favor the formation of micelles. The reaction then looked cloudy. After dropping another sample for analysis, 50 mL of divinylbenzene was added to the reaction mixture, in order to effect the cross-linking. No exotherm could be observed. After one hour of reaction, the reaction mixture was cooled and dropped in an isopropanol/acetone solution (about 500 mL/2 L) containing BHT. The solid was then filtered through cheesecloth and drum-dried.

Examples 48–50

Application of the Particles in Rubber Compounds

Three kinds of rubber compositions were prepared according to the formulation shown in Tables 31 and 32, where the total of the polybutadiene and polymer micelle used equals 100. Two comparisons were made, one with no polymer micelle (Example 48), the other with an unfunctionalized polymer micelle (Example 50), to allow for comparison. Each sample was prepared as described in Table 33. The final stock was sheeted and molded at 160° C. for 30 minutes.

On the vulcanized rubber compounds of Examples 48–50 measurement of the tensile strength, tear strength, hysteresis loss gave the results shown in Table 34. Measurement of the tensile strength is based on conditions of ASTM-D 412 at 22° C. Test specimen geometry was taken in the form of a ring of a width of 0.13 cm and of a thickness of 0.2 cm. The specimen was tested at a specific gauge length of 2.54 cm. The measurement of tear strength is based on conditions of ASTM-D 624 at 170° C. Test specimen geometry was taken the form of a nicked ring (ASTM-624-C). The specimen was tested at the specific gauge length of 4.4 cm. The hysteresis loss was measured with a Dynastat Viscoelastic Analyser. Test specimen geometry was taken in the form of a cylinder with a diameter of 30 mm and of a length of 15 mm. The following testing conditions were employed: frequency 1 Hz, dynamic mass 1.25 mPa, and static mass 2.00 mPa.

As can be seen in Table 34, Examples 48–50 display comparable Mooney viscosities, hardness and tensile strength. Polymer micelle-containing samples display improved tear strength and elastic modulus, as compared to the control (Example 48). The tin-containing polymer micelle has a better dynamic modulus than the non-functionalized (Example 49 versus Example 50), with no marked difference in tan δ. This property is important for improving the snow/wet traction and handling of rubber compounds for tire uses.

TABLE 31

Composition for Master Batch

| Component | pbw |
|---|---|
| Polymer | 100.00 |
| Carbon Block | 50.00 |
| Aromatic Oil | 15.00 |
| Zinc Oxide | 3.00 |
| Hydrocarbon Resin (tackifiers) | 2.00 |
| Santoflex 13 (antioxidants) | 0.95 |
| Stearic acid | 2.00 |
| Wax | 1.00 |

TABLE 32

Composition for Final Batch

| Additional Components added to Master Batch | pbw |
|---|---|
| Sulfur | ~1.30 |
| Cyclohexyl-benzothiazole sulfenamide (accelerator) | 1.40 |
| Diphenylguanidine (accelerator) | 0.20 |

TABLE 33

Mixing Conditions

Mixer: 300 g Brabender   Agitation Speed: 60 rpm

| Master Batch Stage | |
|---|---|
| Initial Temperature | 110° C. |
| 0 min | charging polymers |
| 0.5 min | charging oil and Carbon Black |
| 5.0 min | drop |
| Final Batch Stage | |
| Initial Temperature | 75° C. |
| 0 sec | charging master stock |
| 30 sec | charging curing agent and accelerators |
| 75 sec | drop |

TABLE 34

Summary of Experimental Results

| Experiment | Example 48 | Example 49 | Example 50 |
|---|---|---|---|
| Nano-particle PS-BR-Sn | | 10 | |
| PS-SBR | | | 10 |
| HX 301 (Diene 40 NF BR Rubber) (Firestone Polymers) | 100 | 90 | 90 |
| Carbon Black | 50 | 50 | 50 |
| Aromatic Oil | 15 | 15 | 15 |
| 130° C. ML4 Viscosity | 40.22 | 44.12 | 39.99 |
| Carbon black dispersion | | | |
| Index | 99.5 | 98.6 | 99.6 |
| Shore A 22° C. (3 sec) | 58.7 | 62.8 | 60.2 |
| 100° C. (3 sec) | 56.7 | 56.8 | 55.5 |
| Ring Tensile | | | |
| 23° C. Tb (kPa) | 15.185 | 14.910 | 15.585 |
| Eb (%) | 447 | 483 | 513 |
| M300 | 1191 | 1100 | 1042 |
| M50 | 175 | 186 | 176 |
| Ring Tear Strength (kg/cm) | 32.4 | 37.1 | 39.6 |
| travel (%) 170° C. | 366 | 431 | 434 |
| Tg of Compound (tan δ) | −74 | −73 | −74 |
| Stanley London (concrete) | 52 | 53 | 53 |
| Dynstat M'50° C. (mPa) | 7.2122 | 9.9998 | 8.4778 |
| M'23° C. | 8.07500 | 12.605 | 10.432 |
| M'0° C. | 10.075 | 17.628 | 12.887 |
| M'−20° C. | 12.519 | 21.948 | 16.665 |
| tan δ 50° C. | 0.17659 | 0.23439 | 0.23018 |
| tan δ 0° C. | 0.23174 | 0.26266 | 0.2661 |
| tan δ −20° C. | 0.25449 | 0.27052 | 0.28281 |

Example 51

Preparation of Nano-Particles with Controlled Density

The reactor was charged with 545 g hexane and 544 g butadiene blend B-22. The jacket of the reactor was heated to 74° C. When the batch reached 69° C., 5.4 mL of 1.6 M n-butyllithium were added, diluted with about 20 mL of hexane. The polymerization exothermed at 86° C. after 3 minutes of reaction. After 2 hours, a 200 mL sample was dropped for analysis. More butyllithium (5.4 mL) and styrene blend (680 g) were added to the reactor, still maintaining the jacket temperature to 74° C. An exotherm peak was observed at 85° C. after 3 minutes. After 15 minutes, 816 g hexane were added, in order to favor the formation of micelles. Indeed, the reaction then looked cloudy. After dropping another sample for analysis, 50 mL of DVB was added to the reaction mixture, in order to effect the cross-linking. No exotherm could be observed. After 1.5 hour of reaction, the reaction mixture was cooled down and dropped in an isopropanol/acetone solution (about 500 mL/2 L) containing BHT. The solid was then filtered through cheese cloth and drum dried.

Examples 52–54

Application of the Nano-Particles in Rubber Compounds

Three kinds of rubber compositions were prepared according to the formulation shown in Tables 35 and 36, where the total parts of polybutadiene and polymer micelle used equals 100. Two controls were used, one with no polymer micelle at all (Example 52), the other one with polymer micelle formed entirely of diblock polymers (Example 54), to allow comparison. Example 53 includes the Nano-Particles of Example 51. Each sample was prepared as described in Table 37. The final stock was sheeted and molded at 160° C. for 3 minutes.

On the vulcanized rubber compounds of Examples 52–54, measurement of the tensile strength, tear strength, hysteresis loss gave the results shown in Table 38. Measurement of the tensile strength is based on conditions of ASTM-D 412 at 22° C. Test specimen geometry was taken the form of a ring of a width of 0.13 cm and of a thickness of 0.2 cm. The specimen was tested at a specific gauge length of 2.54 cm. The measurement of tear strength is based on conditions of ASTM-D 624 at 170° C. Test specimen geometry was taken the form of a nicked ring (ASTM-624-C). The specimen was tested at the specific gauge length of 4.4 cm. The hysteresis loss was measured with a Dynastat Viscoelastic Analyser. Test specimen geometry was taken in the form of a strip of a length of 30 mm and of a width of 15 mm. The following testing conditions were employed: Frequency 1 Hz, dynamic mass 1.25 Mpa, and static mass 2.00 Pa.

As can be seen in Table 38, Examples 52–54 display comparable Mooney viscosities, hardness and tensile strength. Polymer micelle-containing samples display improved tear strength and elastic modulus, as compared to the control (Example 52). The polymer nano-particle containing both diblock and mono-block polymer chains has a better dynamic modulus than the nano-particle containing only diblock polymers (Example 53 versus Example 54), with no marked difference in tan δ.

TABLE 35

Composition for Master Batch

| Component | pbw |
|---|---|
| Polybutadiene | 100.00 |
| Carbon Black (N343) | 50.00 |
| Aromatic Oil | 15.00 |
| Zinc Oxide | 3.00 |
| Hydrocarbon Resin (tackifiers) | 2.00 |
| Santoflex 13 (antioxidants) | 0.95 |
| Stearic acid | 2.00 |
| Wax | 1.00 |

TABLE 36

Composition for final batch

| | pbw |
|---|---|
| Sulfur | ~1.30 |
| Cyclohexyl-benzothiazole sulfenamide (accelerator) | 1.40 |
| Diphenylguanidine (accelerator) | 0.20 |

TABLE 37

Mixing conditions

| Mixer: 300 g Brabender | Agitation Speed: 60 rpm |
|---|---|
| Master Batch Stage | |
| Initial Temperature | 110° C. |
| 0 min | charging polymers |
| 0.5 min | charging oil and Carbon Black |
| 5.0 min | drop |
| Final Batch Stage | |
| Initial Temperature | 75° C. |
| 0 sec | charging master stock |
| 30 sec | charging curing agent and accelerators |
| 75 sec | drop |

TABLE 38

Summary of the experimental results

| Experiment | Example 52 | Example 53 | Example 54 |
|---|---|---|---|
| Test Polymer di-block and mono-block nano-particle | 0 | 10 | 0 |
| di-block nano-particle | 0 | 0 | 10 |
| Diene 40 NF BR rubber, Firestone Polymers | 100 | 90 | 90 |
| Carbon Black | 50 | 50 | 50 |
| Aromatic Oil | 15 | 15 | 15 |
| 130° C. ML4 viscosity | 40.22 | 44.12 | 39.99 |
| Carbon black dispersion | | | |
| Index | 99.5 | 98.6 | 99.6 |
| Shore A 22° C. (3 sec) | 58.7 | 62.8 | 60.2 |
| 100° C. (3 sec) | 56.7 | 56.8 | 55.5 |
| Ring Tensile | | | |
| 23° C. Tb (kPa) | 15.186 | 14.951 | 15.585 |
| Eb (%) | 447 | 483 | 513 |
| M300 | 1191 | 1100 | 1042 |
| M50 | 175 | 186 | 176 |
| Ring Tear Strength (kg/cm) travel | 32.4 | 37.1 | 39.6 |
| (%) 170° C. | 366 | 431 | 434 |
| Tg of Compound (tan δ) | −74 | −73 | −74 |
| Stanley London (concrete) | 52 | 53 | 53 |
| Dynstat M'50° C. (mPa) | 7.2122 | 9.9998 | 8.4778 |
| M'23° C. | 8.07500 | 12.605 | 10.432 |
| M'0° C. | 10.075 | 17.628 | 12.887 |
| M'−20° C. | 12.519 | 21.948 | 16.665 |
| tan δ 50° C. | 0.17659 | 0.23439 | 0.23018 |
| tan δ 0° C. | 0.23174 | 0.26266 | 0.2661 |
| tan δ −20° C. | 0.25449 | 0.27052 | 0.28281 |

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A process for forming polymer nano-particles comprising:
   a. polymerizing alkenylbenzene and conjugated diene monomer in a hydrocarbon solvent solvent in the presence of a functionalized initiator to form a diblock polymer;
   b. forming a mixture including micelles of said diblock polymer; and
   c. adding at least one cross-linking agent to the polymerization mixture to form cross-linked nano-particles from said micelles, said nano-particles comprising a poly (alkenylbenzene) core and a poly (conjugated diene) surface.

2. The process of claim 1 wherein said functionalized initiator comprises lithium.

3. The process of claim 1 further including a hydrogenation step converting said poly (conjugated diene) surface to a poly (alkylene) surface.

4. The process of claim 1 further including polymerization of alkenylbenzene to form a mono-block polymer.

5. The process of claim 4 wherein the ratio of said mono-block polymer to said diblock polymer is controlled by selective addition of initiator and optionally a further monomer addition.

6. The process of claim 1 wherein said diblock polymer includes a poly(alkenylbenzene) block and a copolymer block.

7. A process for forming polymer nano-particles comprising:
   a. polymerizing alkenylbenzene monomer and conjugated diene monomer in a hydrocarbon solvent in the presence of a functionalized initiator to form a diblock polymer;
   b. forming a polymerization mixture including micelles of said diblock polymer;
   c. adding at least one crosslinking agent to the polymerization mixture to form crosslinked nano-particles from said micelles; and
   d. hydrogenating a poly(conjugated diene) layer of said nano-particles to form nano-particles containing a poly (alkenylbenzene) inner layer and a polycrystalline outer layer.

8. The process of claim 7 wherein step a is performed in the presence of a functionalized lithium initiator.

9. The process of claim 7 wherein subsequent to step a, further hydrocarbon solvent is added to the polymerization mixture.

10. The process of claim 7 including a further step wherein mono-block polymer comprising poly (alkenylbenzene) is formed prior to step b.

11. A process for forming a functionalized polymer nano-particle composition comprising:
   a. polymerizing alkenylbenzene monomer and conjugated diene monomer in a hydrocarbon solvent, in the presence of a functionalized initiator, to form a diblock polymer;
   b. forming a polymerization mixture including micelles of said diblock polymer; and
   c. adding at least one crosslinking agent to the polymerization mixture to form crosslinked nano-particles from said micelles, said nano-particles having a mean average diameter less than about 100 nm.

12. The process of claim 11 wherein said functionalized initiator is a functionalized lithium initiator.

13. The process of claim 12 wherein said functionalized lithium initiator includes a functional group selected from the group consisting of carboxylic acids, alcohols, amines, formyl, tin, silicon, silyl ether, and mixtures thereof.

14. The process of claim 13 wherein said functionalized anionic polymerization initiator is hexamethylene imine propyllithium.

15. The process of claim 12 further including a hydrogenation step.

16. The process of claim 1 wherein said nano-particles have diameters less than about 100 nm.

17. The process of claim 7 wherein said nano-particles have diameters less than about 100 nm.

18. The process of claim 1 wherein said nano-particles have a dispersity less than about 1.3.

19. The process of claim 7 wherein said nano-particles have a dispersity less than about 1.3.

20. The process of claim 11 wherein said nano-particles have a dispersity less than about 1.3.

21. The process of claim 1 wherein said hydrocarbon solvent is selected from pentane, hexane, heptane, octane, nonane, decane, cyclohexane, methyl cyclopentane, cyclooctane, cyclopentane, cycloheptane, cyclononane, cyclodecane and mixtures thereof.

22. The process of claim 7 wherein said hydrocarbon solvent is selected from pentane, hexane, heptane, octane, nonane, decane, cyclohexane, methyl cyclopentane, cyclooctane, cyclopentane, cycloheptane, cyclononane, cyclodecane and mixtures thereof.

23. The process of claim 11 wherein said hydrocarbon solvent is selected from pentane, hexane, heptane, octane, nonane, decane, cyclohexane, methyl cyclopentane, cyclooctane, cyclopentane, cycloheptane, cyclononane, cyclodecane and mixtures thereof.

24. The process of claim 1 wherein step c is performed at a temperature between about 40 and 100° C.

25. The process of claim 7 wherein step c is performed at a temperature between about 40 and 100° C.

26. The process of claim 11 wherein step c is performed at a temperature between about 40 and 100° C.

27. The process of claim 1 wherein said cross-linking agent is selected from di-or-tri-vinyl substituted aromatic compounds.

28. The process of claim 7 wherein said cross-linking agent is selected from di-or-tri-vinyl substituted aromatic compounds.

29. The process of claim 11 wherein said cross-linking agent is selected from di-or-tri-vinyl substituted aromatic compounds.

30. The process of claim 1 wherein said diblock polymer has a Mw between about 5,000 and 200,000.

31. The process of claim 7 wherein said diblock polymer has a Mw between about 5,000 and 200,000.

32. The process of claim 11 wherein said diblock polymer has a Mw between about 5,000 and 200,000.

33. The process of claim 1 wherein a polymerization of conjugated diene monomer is performed before step a, such that said diblock polymer includes a mono-block portion.

34. The process of claim 7 wherein step d is performed in the presence of a catalyst and hydrogen gas.

35. The process of claim 34 wherein said catalyst comprises one of Pt, Pd, Rh, Ru, Ni and mixtures thereof.

36. The process of claim 1 wherein said initiator is selected from ethyllithium, propyllithium, n-butyllithium, sec-butyllithium, tert-butyllithium, phenyllithium, tolyllithium, vinyllithium, propenyllithium, tetramethylene lithium, pentamethylene lithium, p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, lithium diaryl phosphine and mixtures thereof.

37. The process of claim 7 wherein said initiator is selected from ethyllithium, propyllithium, n-butyllithium, sec-butyllithium, tert-butyllithium, phenyllithium, tolyllithium, vinyllithium, propenyllithium, tetramethylene lithium, pentamethylene lithium, p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, lithium diaryl phosphine and mixtures thereof.

38. The process of claim 11 wherein said initiator is selected from ethyllithium, propyllithium, n-butyllithium, sec-butyllithium, tert-butyllithium, phenyllithium, tolyllithium, vinyllithium, propenyllithium, tetramethylene lithium, pentamethylene lithium, p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, lithium diaryl phosphines and mixtures thereof.

39. The process of claim 1, wherein said initiator includes a functional group selected from amino, formyl, carboxylic acid, alcohol, tin, silicon, silyl ether, and mixtures thereof.

40. The process of claim 7, wherein said initiator includes a functional group selected from amino, formyl, carboxylic acid, alcohol, tin, silicon, silyl ether, and mixtures thereof.

\* \* \* \* \*